US008487867B2

(12) United States Patent
Wu et al.

(10) Patent No.: US 8,487,867 B2
(45) Date of Patent: Jul. 16, 2013

(54) BEHAVIOR RECOGNITION SYSTEM AND METHOD BY COMBINING IMAGE AND SPEECH

(75) Inventors: Chung-Hsien Wu, Tainan (TW); Jen-Chun Lin, Taichung (TW); Wen-Li Wei, Kaohsiung (TW); Chia-Te Chu, Tainan (TW); Red-Tom Lin, Tainan (TW); Chin-Shun Hsu, Kaohsiung (TW)

(73) Assignee: Institute for Information Industry, Taipei (TW)

( * ) Notice: Subject to any disclaimer, the term of this patent is extended or adjusted under 35 U.S.C. 154(b) by 884 days.

(21) Appl. No.: 12/634,148

(22) Filed: Dec. 9, 2009

(65) Prior Publication Data

US 2011/0109539 A1 May 12, 2011

(30) Foreign Application Priority Data

Nov. 10, 2009 (TW) ................................ 98138039 A

(51) Int. Cl.
*G09G 5/00* (2006.01)

(52) U.S. Cl.
USPC ........... 345/156; 715/863; 704/260; 704/270; 704/270.1; 704/275

(58) Field of Classification Search
None
See application file for complete search history.

(56) References Cited

U.S. PATENT DOCUMENTS

| | | | | |
|---|---|---|---|---|
| 7,515,770 | B2 * | 4/2009 | Fukada | 382/284 |
| 2003/0212557 | A1 * | 11/2003 | Nefian | 704/256 |
| 2004/0186718 | A1 * | 9/2004 | Nefian et al. | 704/256 |
| 2005/0027530 | A1 * | 2/2005 | Fu et al. | 704/256 |
| 2007/0201558 | A1 * | 8/2007 | Xu et al. | 375/240.22 |
| 2008/0111887 | A1 * | 5/2008 | Cooper et al. | 348/194 |

FOREIGN PATENT DOCUMENTS

JP 2002-182685 A2 6/2002

* cited by examiner

*Primary Examiner* — Lixi C Simpson
(74) *Attorney, Agent, or Firm* — Muncy, Geissler, Olds & Lowe, PLLC

(57) ABSTRACT

A behavior recognition system and method by combining an image and a speech are provided. The system includes a data analyzing module, a database, and a calculating module. A plurality of image-and-speech relation modules is stored in the database. Each image-and-speech relation module includes a feature extraction parameter and an image-and-speech relation parameter. The data analyzing module obtains a gesture image and a speech data corresponding to each other, and substitutes the gesture image and the speech data into each feature extraction parameter to generate image feature sequences and speech feature sequences. The data analyzing module uses each image-and-speech relation parameter to calculate image-and-speech status parameters. The calculating module uses the image-and-speech status parameters, the image feature sequences, and the speech feature sequences to calculate a recognition probability corresponding to each image-and-speech relation parameter, so as to take a maximum value among the recognition probabilities as a target parameter.

17 Claims, 23 Drawing Sheets

11
12
3

BEHAVIOR RECOGNITION SYSTEM AND METHOD BY COMBINING IMAGE AND SPEECH

CROSS-REFERENCE TO RELATED APPLICATION

This application claims the benefit of Taiwan Patent Application No. 098138039, filed on Nov. 10, 2009, which is hereby incorporated by reference for all purposes as if fully set forth herein.

BACKGROUND OF THE INVENTION

1. Field of Invention

The present invention relates to a behavior recognition system and a behavior recognition method and more particularly to a behavior recognition system and a behavior recognition method by combining an image and a speech, which are applicable to recognize a correct behavior through a sequence corresponding relation between the image and the speech.

2. Related Art

FIG. 1A is a schematic view of image recognition in the prior art, and FIG. 1B is a schematic view of speech recognition in the prior art.

In the prior art, the recognition technology includes image recognition and speech recognition. Taking the image recognition technology as an example, a plurality of image samples is stored in a recognition host 2. A camera module 11 shoots a gesture of a user to generate a gesture image, and matches the gesture image with the image samples, so as to obtain an execution instruction corresponding to the gesture image. Moreover, image feature extraction is performed on the whole gesture image, so as to enhance a recognition rate of the gesture image through a feature value comparison technology.

As for the speech recognition technology, a plurality of speech samples is stored in the recognition host 2. A microphone 12 receives a sound made by the user to generate a speech data, and matches the speech data with the speech samples, so as to obtain an execution instruction corresponding to the speech data. Moreover, speech feature extraction is performed on the whole speech data, so as to enhance a recognition rate of the speech data through the feature value comparison technology.

In order to enhance the recognition rate, some manufacturer further proposes a recognition technology by combining a gesture image and a speech data. However, as for the image recognition technology, although a current image recognition system is combined with the image feature extraction technology, a problem about feature extraction errors caused by repetitive gesture images is not considered, so that the recognition rate is not increased but decreased instead. Next, if the image recognition technology is not used together with the speech recognition technology, once the gesture image recognition fails, the recognition system cannot derive intentions of human behaviors and motions correctly. Similarly, if the speech recognition technology is not used together with the image recognition technology, once the speech data recognition fails, the recognition system also cannot derive intentions of human behaviors and motions correctly. However, the recognition technologies by combining the gesture image and the speech data usually combine the gesture image and the speech data in a linear manner. Once the recognition system fails to recognize either the image or the speech due to external factors (for example, the speech data includes excessive noises, or the gesture image includes excessive light source interferences, or an abnormal feature data is extracted), an incorrect recognition result occurs during the linear combination of the gesture image and the speech data.

Therefore, the manufacturers consider how to reduce influences on the recognition system caused by external interference factors, even how to reduce situations that the recognition system extracts abnormal features, and to enhance a recognition rate for human behaviors and motions.

SUMMARY OF THE INVENTION

The present invention is directed to a behavior recognition system and a behavior recognition method, which are applicable to reduce influences on a recognition system caused by external interference factors and enhance a recognition rate for human behaviors and motions.

In order to solve the above system problems, the present invention provides a behavior recognition system by combining an image and a speech, which includes a database, a data analyzing module, and a calculating module. The database includes a plurality of image-and-speech relation modules. Each image-and-speech relation module includes a feature extraction parameter and an image-and-speech relation parameter. The data analyzing module substitutes a gesture image and a speech data corresponding to each other into each feature extraction parameter to obtain a plurality of image feature sequences and speech feature sequences, and substitutes each image feature sequence and each speech feature sequence corresponding to the same image-and-speech relation module into each image-and-speech relation parameter, so as to calculate a plurality of image-and-speech status parameters. The calculating module uses all the image feature sequences, all the speech feature sequences, and all the image-and-speech status parameters to calculate a recognition probability corresponding to each image-and-speech relation module, and takes a target parameter from all the recognition probabilities.

The present invention provides a behavior recognition method by combining an image and a speech, which includes the following steps. A gesture image and a speech data corresponding to each other are obtained. A plurality of image-and-speech relation modules is provided, in which each image-and-speech relation module includes a feature extraction parameter and an image-and-speech relation parameter. The gesture image and the speech data are individually substituted into each feature extraction parameter, so as to calculate a plurality of image feature sequences and a plurality of speech feature sequences. Each image feature sequence and each speech feature sequence corresponding to the same image-and-speech relation module are substituted into each image-and-speech relation parameter, so as to calculate a plurality of image-and-speech status parameters. All the image feature sequences, all the speech feature sequences, and all the image-and-speech status parameters are used to calculate a recognition probability corresponding to each image-and-speech relation module, and a target parameter is taken from all the recognition probabilities.

The feature of the present invention is that, the present invention converts the gesture image and the speech data into image feature sequences and speech feature sequences, and calculates an image-and-speech feature relation between the two sequences, so as to solve the problem that the system extracts incorrect features due to influences of the external interference factors on the gesture image and the speech data, thereby enhancing a recognition rate for human behaviors and motions.

Next, in the image-and-speech feature relation mapping technology disclosed in the present invention, even if repetitive image data included in the gesture image and repetitive speech data included in the speech data are not matched with each other in amount, by converting the gesture image and the speech data into image feature sequences and speech feature sequences that can be matched and calculated, an image-and-speech feature relation between the two sequences can be obtained, so as to facilitate the recognition for human behaviors and motions.

DETAILED DESCRIPTION OF THE INVENTION

The preferred embodiments of the present invention are illustrated in detail below with reference to the accompanying drawings.

Figure 1A:
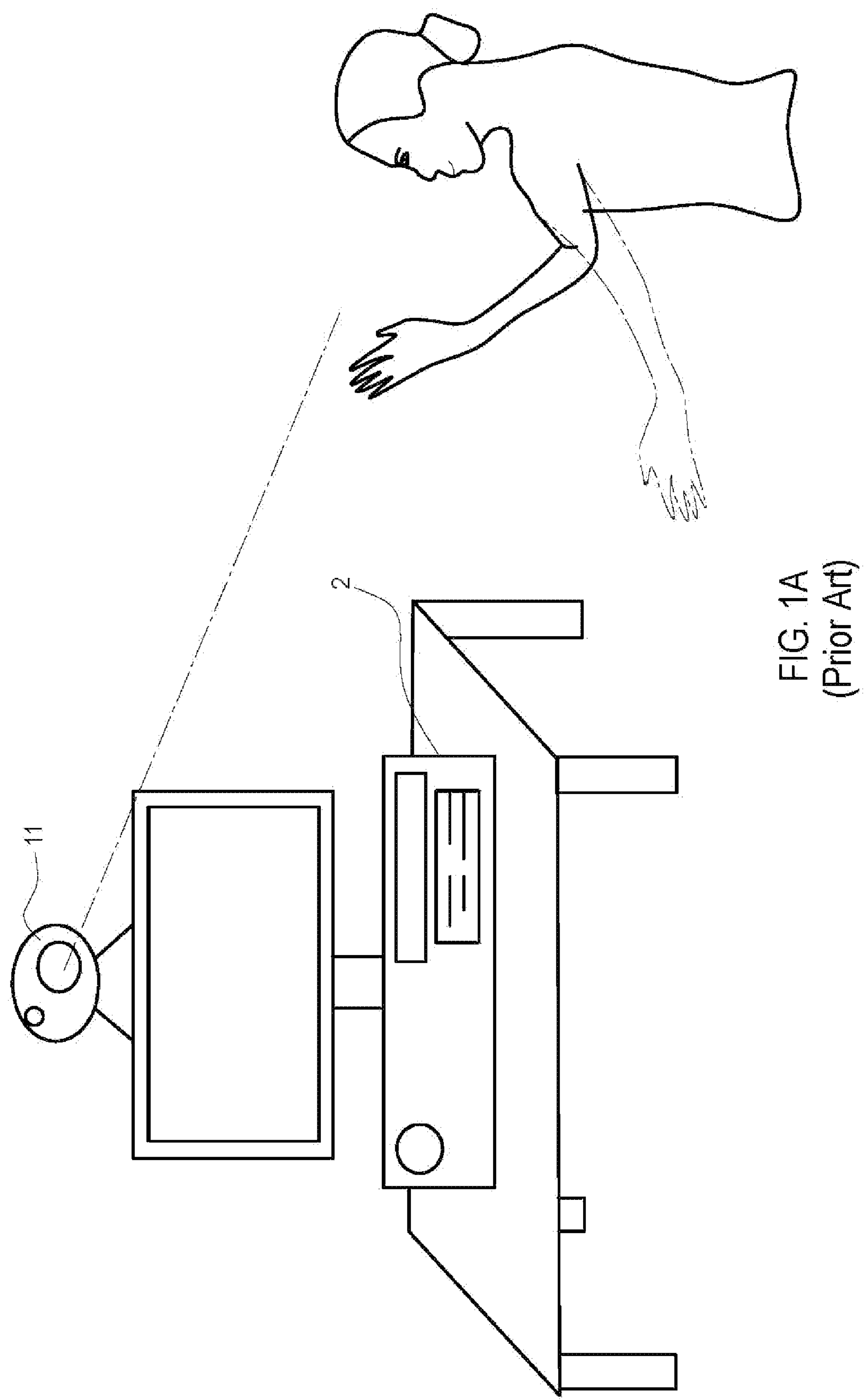
FIG. 1A is a schematic view of image recognition in the prior art.
Figure 1B:
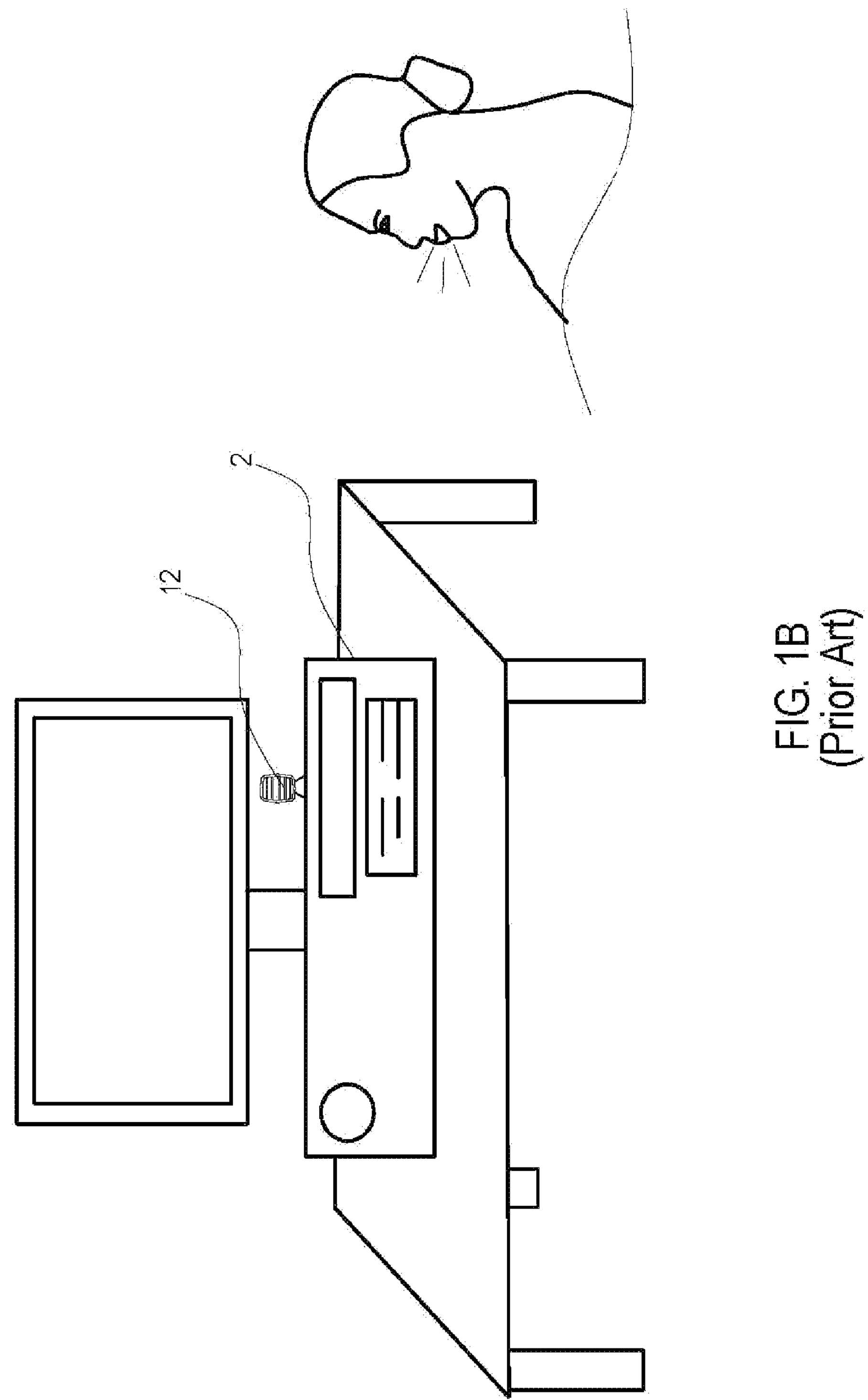
FIG. 1B is a schematic view of speech recognition in the prior art.
Figure 2A:
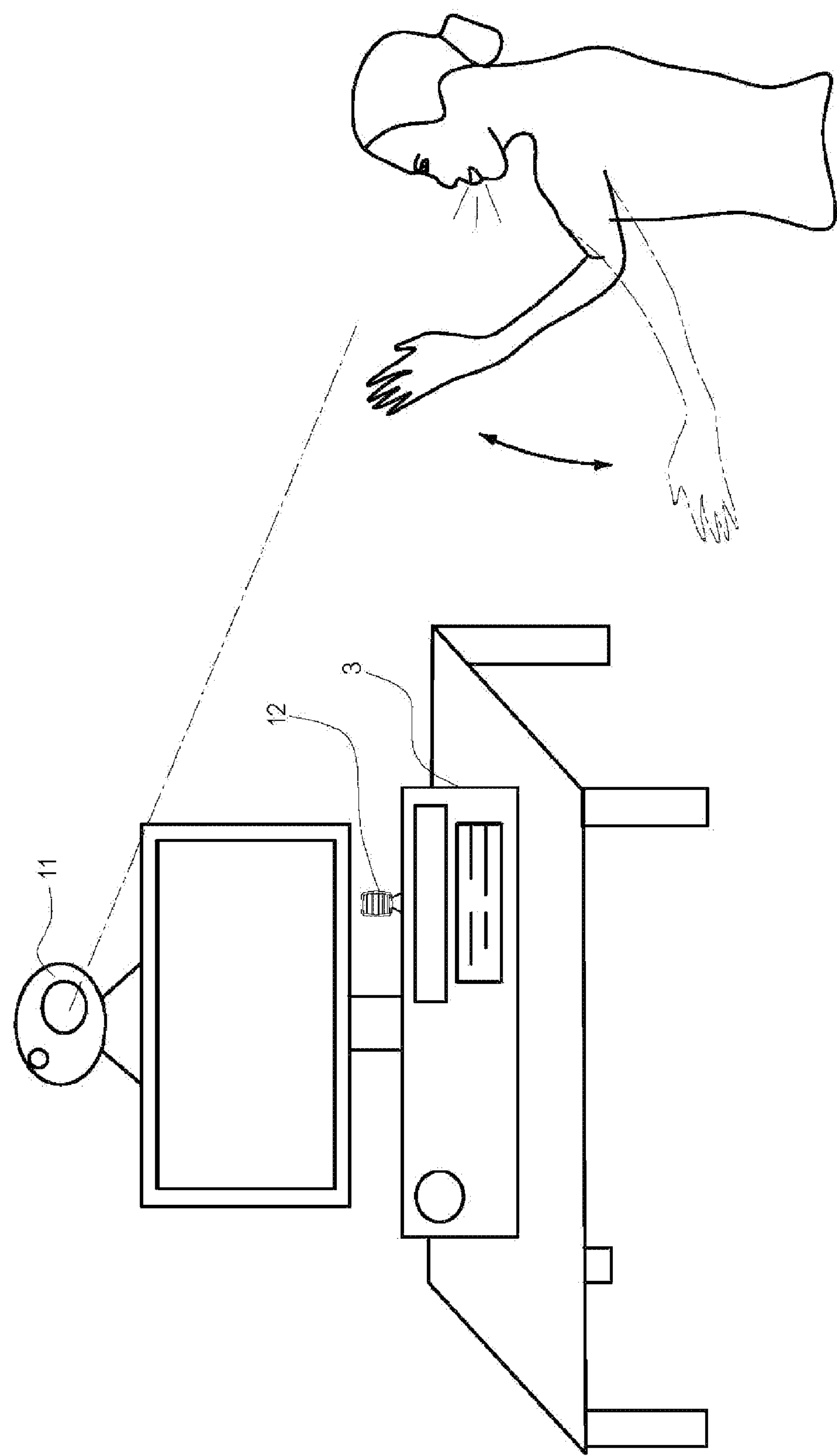
FIG. 2A is an architectural view of a behavior recognition system according to an embodiment of the present invention.
Figure 2B:
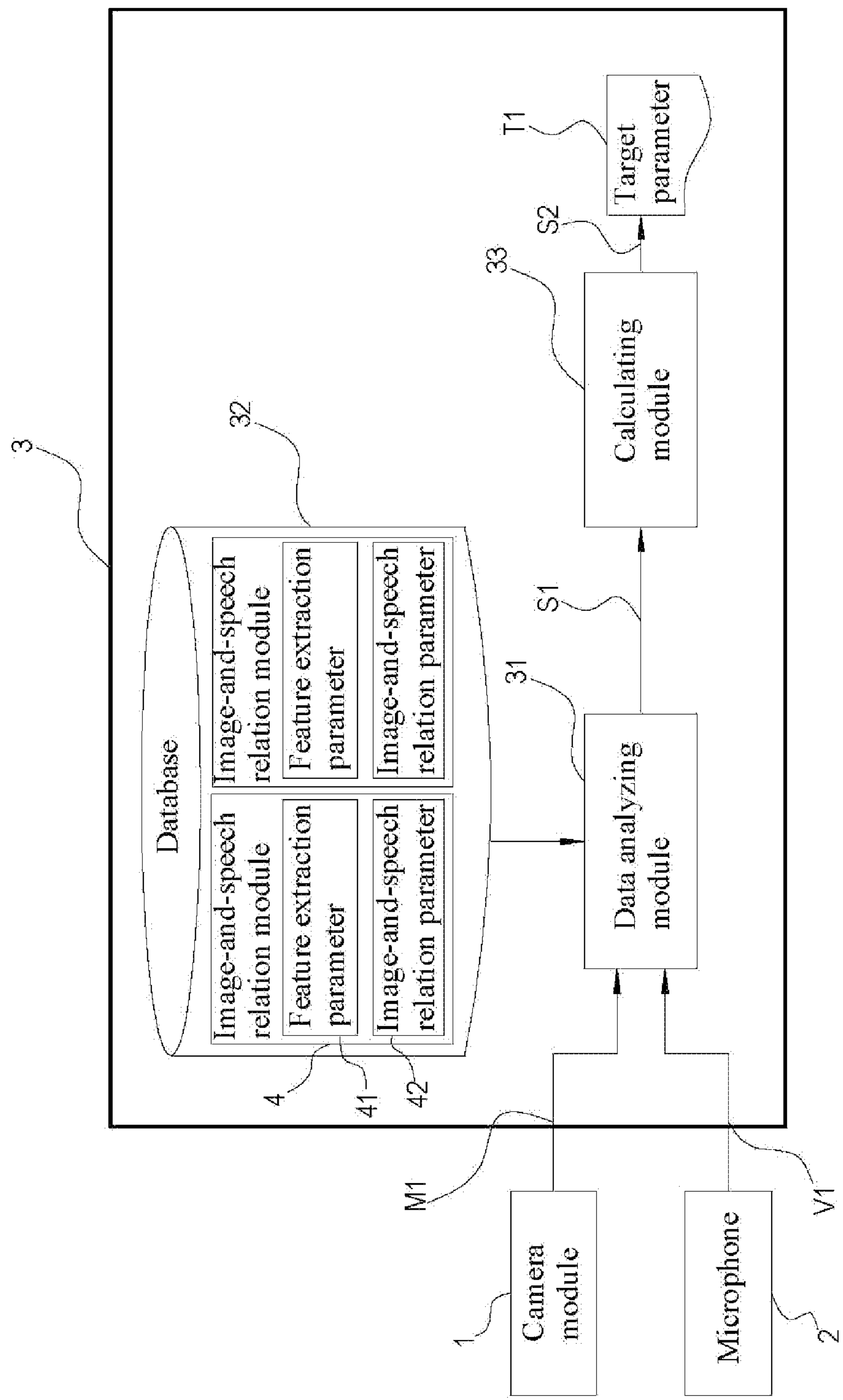
FIG. 2B is a block diagram of a behavior recognition system according to an embodiment of the present invention.
Figure 3A:
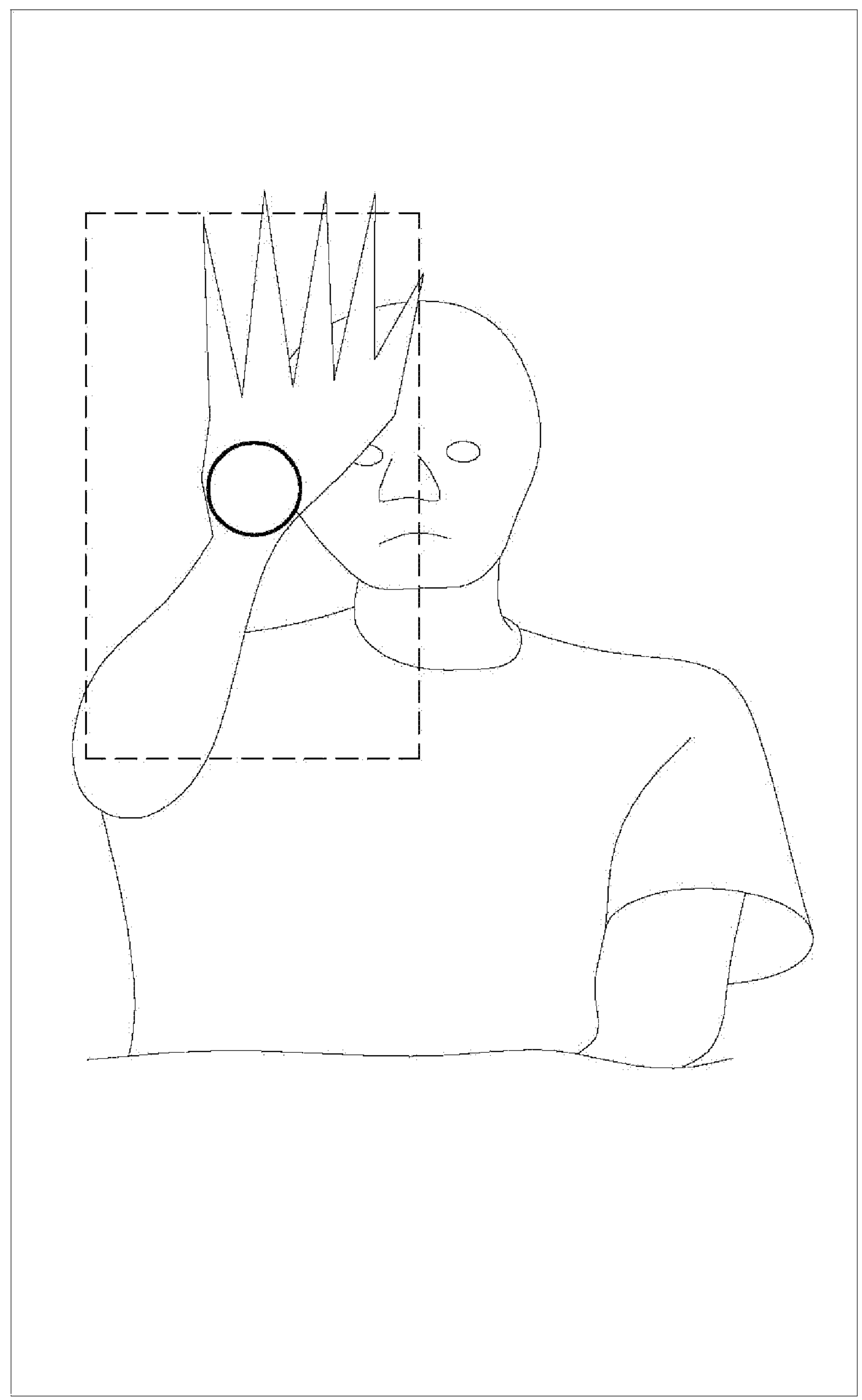
FIG. 3A is a schematic view of feature extraction of a gesture image according to an embodiment of the present invention.
Figure 3B:
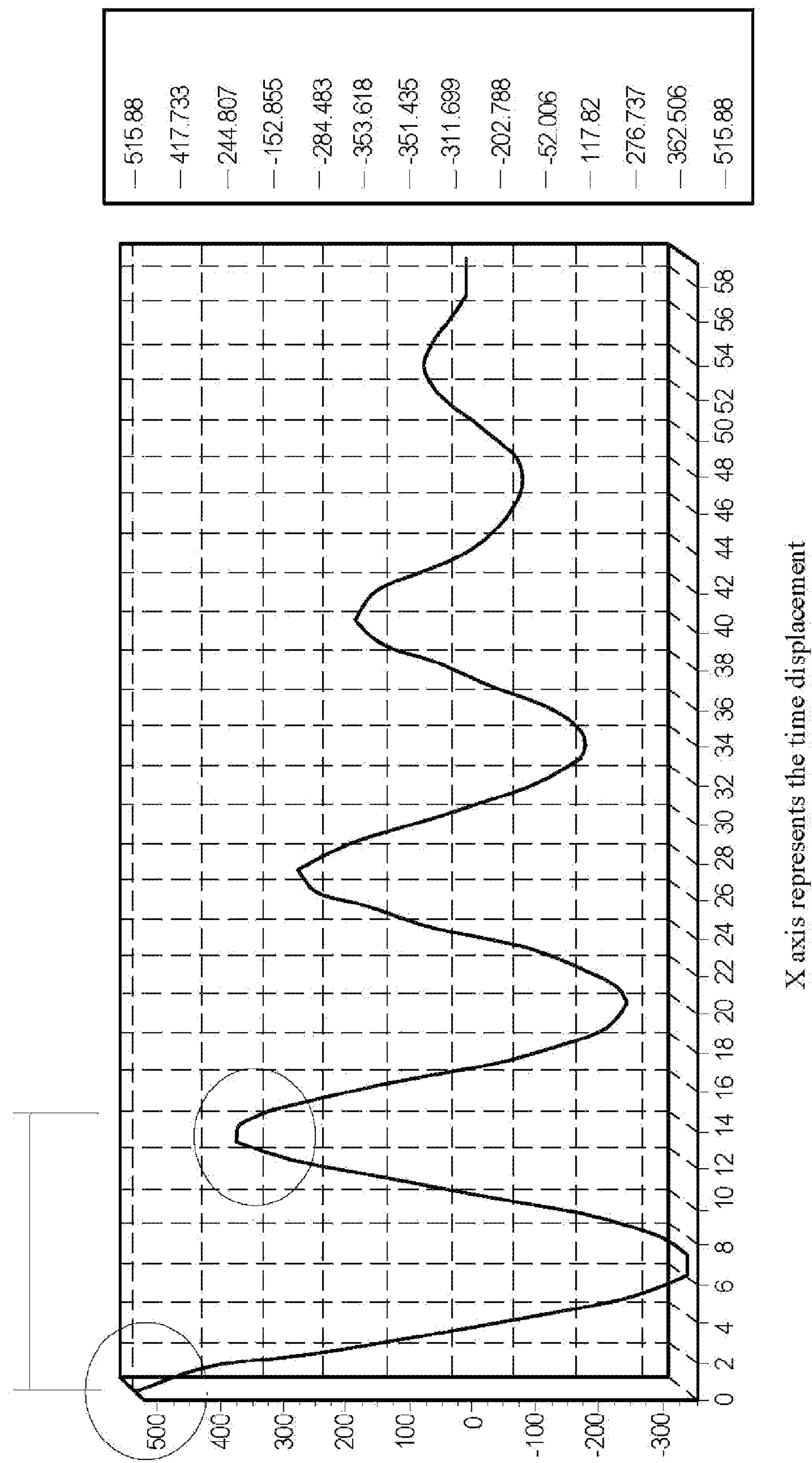
FIG. 3B is a schematic view of converting a moving track of the gesture into a directional curve through quantification according to an embodiment of the present invention.
Figure 3C:
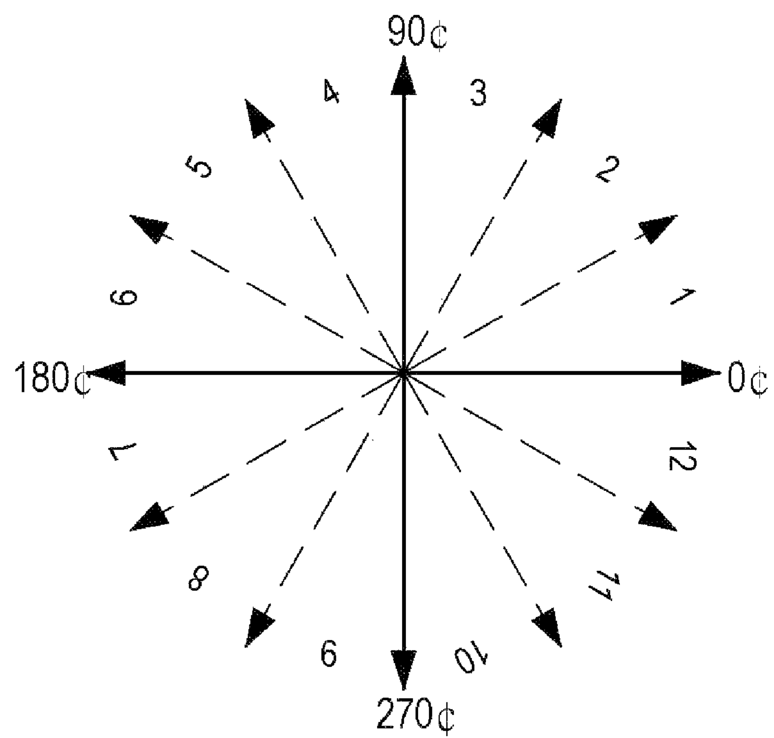
FIG. 3C is a schematic view of angle range quantification according to an embodiment of the present invention.
Figure 4A:
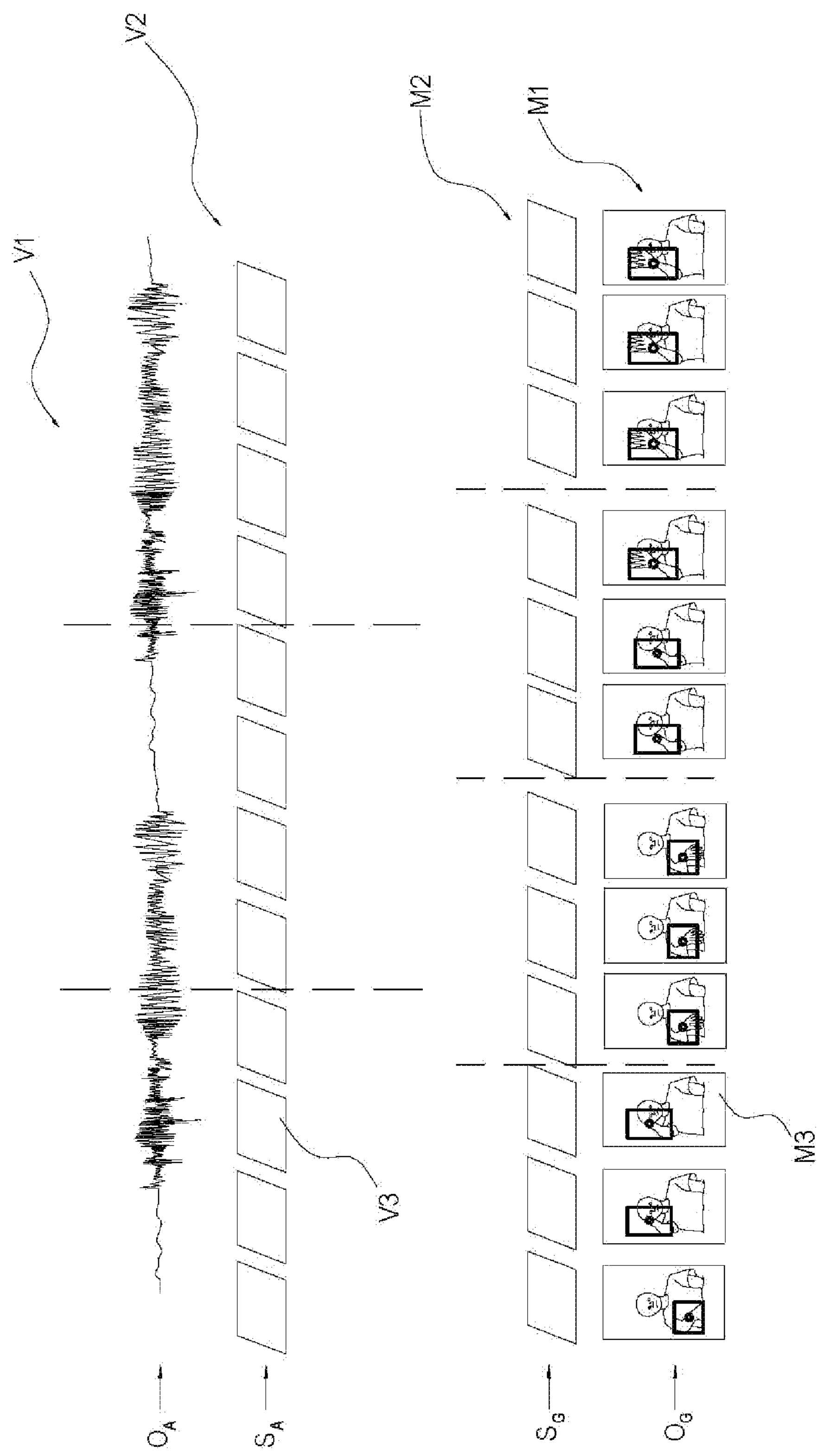
FIG. 4A is a schematic view of sequence initialization according to an embodiment of the present invention.
Figure 4B:
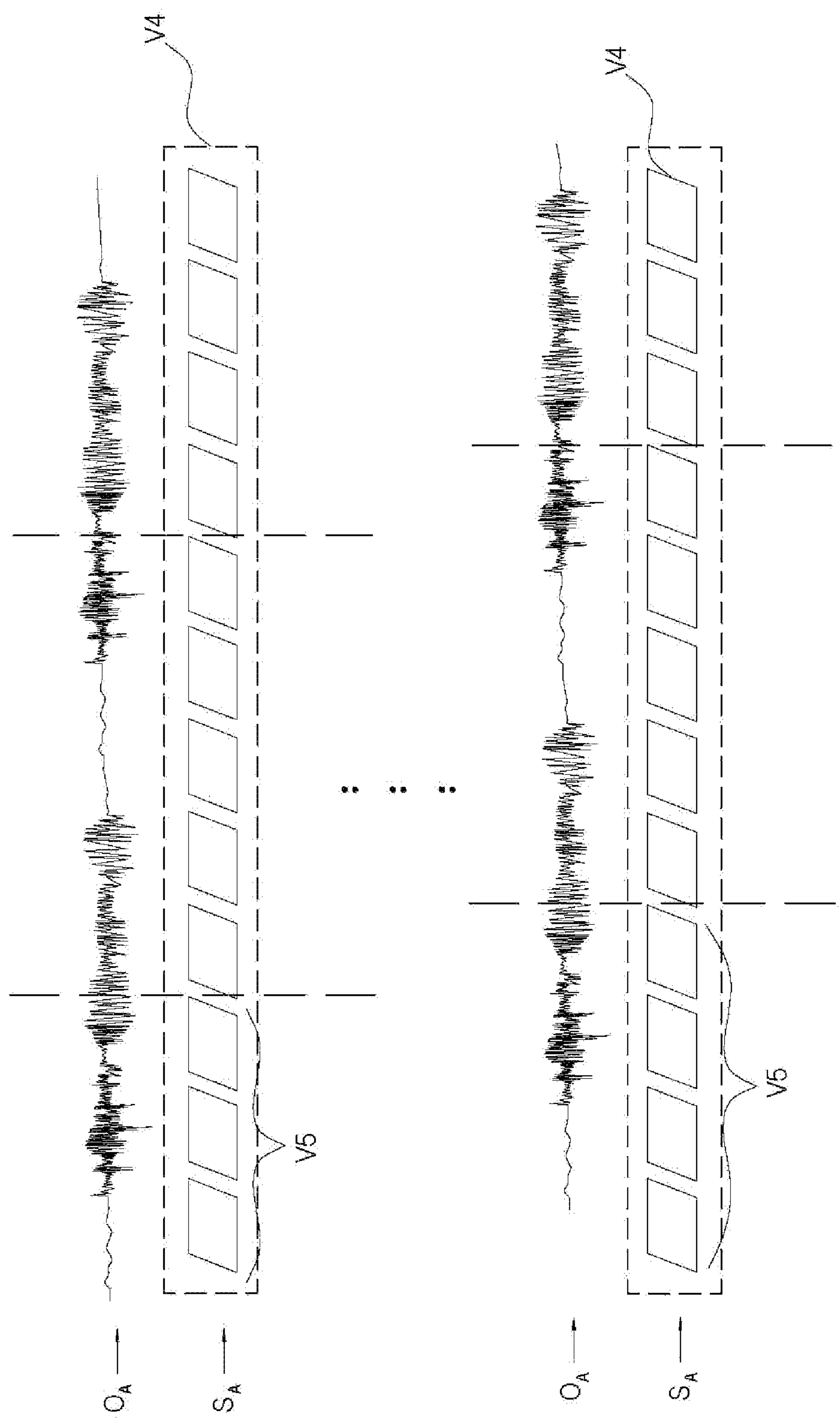
FIG. 4B is a schematic view of dividing speech feature sequences according to an embodiment of the present invention.
Figure 4C:
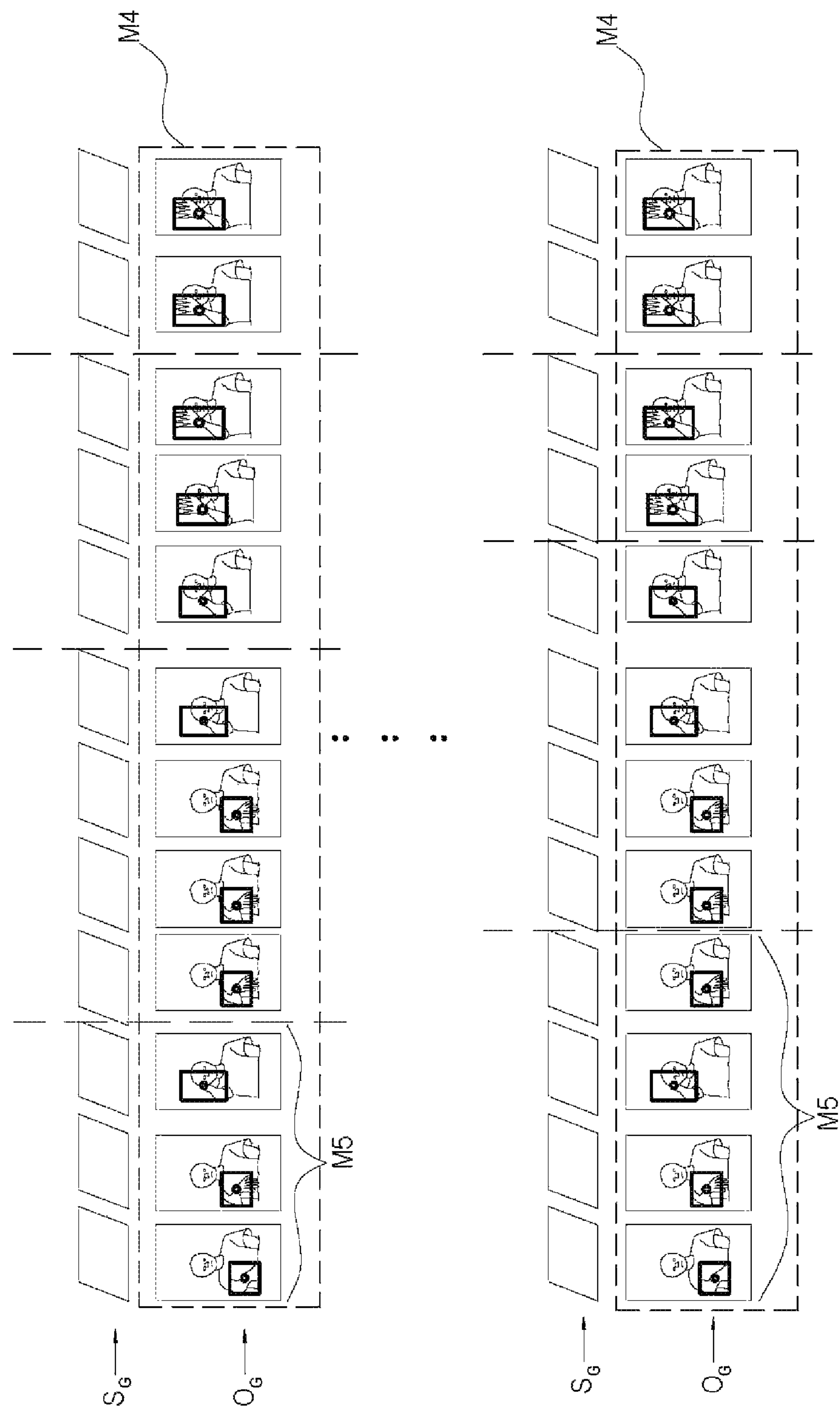
FIG. 4C is a schematic view of dividing image feature sequences according to an embodiment of the present invention.

FIG. 2A is an architectural view of a behavior recognition system by combining an image and a speech according to an embodiment of the present invention, and FIG. 2B is a block diagram of a behavior recognition system by combining an image and a speech according to an embodiment of the present invention. FIG. 3A is a schematic view of feature extraction of a gesture image according to an embodiment of the present invention. FIG. 3B is a schematic view of converting a moving track of the gesture into a directional curve through quantification according to an embodiment of the present invention. FIG. 3C is a schematic view of angle range quantification according to an embodiment of the present invention. FIG. 4A is a schematic view of sequence initialization according to an embodiment of the present invention. FIG. 4B is a schematic view of dividing speech feature sequences according to an embodiment of the present invention. FIG. 4C is a schematic view of dividing image feature sequences according to an embodiment of the present invention.

Referring to FIGS. 2A and 2B, the system in this embodiment is demonstrated as being disposed in a recognition host 3. The recognition host 3 is connected to a camera module 11 and a microphone 12. The recognition host 3 includes a database 32, a data analyzing module 31, and a calculating module 33.

The camera module 11 is an image pickup device capable of shooting images continuously such as a video camera or a digital camera. The camera module 11 is used for shooting a gesture motion of the user, so as to generate a gesture image M1. The microphone 12 is used for receiving a sound made by the user, so as to generate a speech data V1. The gesture image M1 and the speech data V1 are image-and-speech input data in pairs.

The database 32 pre-stores a plurality of image-and-speech relation modules 4. Each image-and-speech relation module 4 includes a feature extraction parameter 41 and an image-and-speech relation parameter 42. For example, each image-and-speech relation module 4 corresponds to one human behavior or motion.

The data analyzing module 31 substitutes the gesture image M1 and the speech data V1 corresponding to each other into each feature extraction parameter 41, so as to obtain a plurality of image feature sequences M2 and a plurality of speech feature sequences V2. The data analyzing module 31 further substitutes each image feature sequence M2 and each speech feature sequence V2 corresponding to the same image-and-speech relation module 4 into each image-and-speech relation parameter 42, so as to calculate a plurality of image-and-speech status parameters S1.

Finally, the calculating module 33 uses the image feature sequences M2, the speech feature sequences V2, and the image-and-speech status parameters S1 to calculate a recognition probability S2 corresponding to each image-and-speech relation module 4 and takes a target parameter T1 from the recognition probabilities S2. Calculation equations used by the calculating module 33 are listed as follows.

$$(G^*, A^*) = \underset{G,A}{\text{argmax}} p(O_G, O_A, S_G, S_A \mid G, A)$$
$$\approx \underset{G,A}{\text{argmax}} p(O_G, S_G, S_A \mid G) p(O_A, S_G, S_A \mid A)$$
$$= \underset{G,A}{\text{argmax}} p(O_G, S_G \mid G) p(S_A \mid S_G, O_G, G) p(S_G \mid S_A, O_A, A) p(O_A, S_A \mid A)$$
$$\approx \underset{G,A}{\text{argmax}} p(O_G, S_G \mid G) p(S_A \mid S_G, G) p(S_G \mid S_A, A) p(O_A, S_A \mid A)$$

In the above equations, (G,A) is a gesture and speech model in the same motion category; $p(O_G,S_G|G)$ is a recognition model of a gesture image M1; $p(S_A|S_G,G)$ is an image-and-speech status parameter for mapping the speech feature sequence $S_A$ to the gesture model G after a certain image feature sequence $S_G$ is given; $p(O_A,S_A|A)$ is a recognition model of a speech instruction; and $p(S_G|S_A, A)$ is an image-and-speech status parameter for mapping the image feature sequence $S_G$ to the speech instruction model A after the speech feature sequence $S_A$ is given. On the recognition aspect, the recognition probability S2 for each image-and-speech relation module 4 is calculated through the following equation.

$$p(S_A,S_G|G)p(O_G,S_G|G)p(S_G,S_A|A)p(O_A,S_A|A) \quad \text{(Equation 1)}$$

Among the recognition probabilities S2, the image-and-speech relation module 4 corresponding to the recognition probability S2 with a maximum value is the behavior and motion category (G*,A*). A detailed operation mode of the system is illustrated below.

FIG. 3A is a schematic view of feature extraction of a gesture image M1 according to an embodiment of the present invention. FIG. 3B is a schematic view of converting a moving track of the gesture into a directional curve through quantification according to an embodiment of the present invention. FIG. 3C is a schematic view of angle range quantification according to an embodiment of the present invention. In this embodiment, the data analyzing module 31 analyzes an image feature value of each image frame in a gesture image M1, so as to calculate a pattern and a position (a portion indicated by a dotted box) of a gesture of the user in each image frame data M3, thereby calculating a moving track of the gesture. Next, the data analyzing module 31 utilizes an autocorrelation function to compute more than one repetitive image data included in the gesture image M1 and extracts any one of the repetitive image data. The autocorrelation function is shown as follows.

$$r_{xx}(k) = \frac{1}{M}\sum_{n=1}^{M} x(n)\cdot x(n+k) \quad \text{(Equation 2)}$$

In the above equation, $r_{xx}(k)$ is an autocorrelation function value for the time displacement k; x(n) is an input for the time n; k is the time displacement; and M is a total amount of the gesture images M1. As for FIG. 3B, the data analyzing module 31 extracts repetitive image data between t=0 and t=14. However, the present invention is not limited thereto, and other repetitive image data may also be used.

In order to achieve a precise result, when the image feature value is extracted, the data analyzing module 31 first uses the schematic view of angle range quantification as shown in FIG. 3C to further convert the image feature value of the gesture image M1 into directional feature description through quantification.

The data analyzing module 31 analyzes a speech feature value of each speech frame data V3 in the speech data V1, converts the speech feature value into a Mel-scale frequency cepstral coefficient (MFCC) to calculate changes of the speech feature of the user in each speech frame data V3, uses Equation 2 to find out more than one repetitive speech data included in the speech data V1, and extracts any one of the repetitive speech data.

Then, the data analyzing module 31 further substitutes the repetitive speech data and the repetitive image data individually into each feature extraction parameter 41, so as to generate a plurality of image feature sequences M2 and a plurality of speech feature sequences V2. Each image-and-speech relation module 4 matches the image feature sequence M2 and the speech feature sequence V2 corresponding to each other into one set. Each image feature sequence M2 includes different data. Similarly, each speech feature sequence V2 also includes different data. It should be noted that, in the speech and image recognition technologies, similarly, different feature samples are used to recognize different gesture images M1 and speech data V1. For example, two execution instructions pre-stored in the database 32 include "Sit Down" and "Leave". As pronunciations of "Sit Down" and "Leave" are different, the extracted feature values of the speech data V1 and the feature samples for making comparison are also different.

FIG. 4A is a schematic view of sequence initialization according to an embodiment of the present invention. FIG. 4B is a schematic view of dividing speech feature sequences V2 according to an embodiment of the present invention. FIG. 4C is a schematic view of dividing image feature sequences M2 according to an embodiment of the present invention.

The data analyzing module 31 substitutes each image feature sequence M2 and each speech feature sequence V2 corresponding to the same image-and-speech relation module 4 into each image-and-speech relation parameter 42, so as to calculate a plurality of image-and-speech status parameters S1.

As shown in FIG. 4A, each image feature sequence M2 includes a plurality of image frame data M3, and each speech feature sequence V2 includes a plurality of speech frame data V3. The data analyzing module 31 performs initialization on the image feature sequences M2 and the speech feature sequences V2, that is, equally divides each image feature sequence M2 and each speech feature sequence V2. In this embodiment, the speech feature sequence V2 is divided into three equal parts, and the image feature sequence M2 is divided into four equal parts.

As shown in FIG. 4B, the data analyzing module 31 utilizes the Hidden Markov Model (HMM) to perform training on the speech feature sequence V2, so as to plan speech frame status combinations V4 in various different division modes. In this embodiment, regardless of the division mode used, the speech feature sequence V2 is divided into three speech frame status groups V5. Each speech frame status group V5 includes more than one speech frame data V3. However, the present invention is not limited thereto, and the speech feature sequence V2 may also be divided into different amount of speech frame status groups V5 such as two, four, five, or six speech frame status groups V5.

As shown in FIG. 4C, the data analyzing module 31 utilizes the HMM to perform training on the image feature sequence M2, so as to plan image frame status combinations M4 in various different division modes. In this embodiment, regardless of the division mode used, the image feature sequence M2 is divided into four image frame status groups M5. Each image frame status group M5 includes more than one image frame data M3. However, the present invention is not limited thereto, and the image feature sequence M2 may also be divided into different amount of image frame status groups M5 such as two, three, five, or six image frame status groups M5.

It should be noted that, the speech frame status combinations V4 are division results obtained by performing division on the same speech feature sequence V2 in different manners. However, the speech frame data V3 included in the speech feature sequence V2 maintains unchanged. Similarly, the image frame status combinations M4 are division results obtained by performing division on the same image feature sequence M2 in different manners. However, the image frame data M3 included in the image feature sequence M2 maintains unchanged.

In this embodiment, the data analyzing module 31 utilizes a Viterbi algorithm to perform HMM training on the image feature sequences M2 and the speech feature sequences V2, so as to find out the speech frame status group V5/image frame status group M5 where each speech frame data V3/image frame data M3 exists at different time points.

Figure 5A:
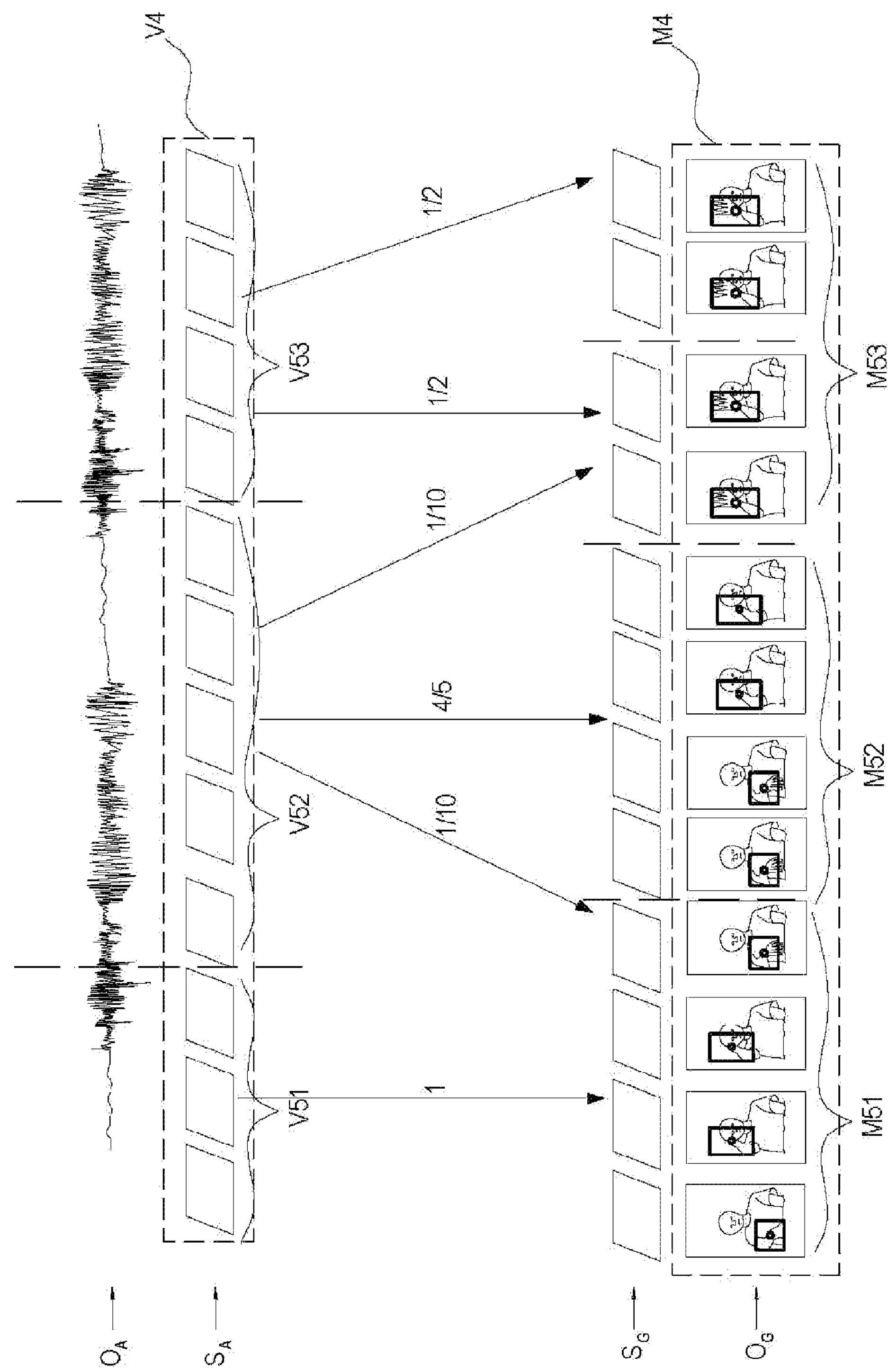
FIG. 5A is a schematic view of mapping relations among statuses according to an embodiment of the present invention.

FIG. 5A is a schematic view of mapping relations among statuses according to an embodiment of the present invention. Each image-and-speech relation module 4 includes an image-and-speech relation parameter 42, which records a probability parameter for mapping each image frame status combination M4 to each speech frame status combination V4 and a probability parameter for mapping each speech frame status combination V4 to each image frame status combination M4 as for the image feature sequences M2 and the speech feature sequences V2 corresponding to the same image-and-speech relation module 4.

Referring to FIG. 5A, one mode for mapping the speech frame status combination V4 to the image frame status combination M4 is shown. However, the present invention is not limited thereto. In this embodiment, the image feature sequence M2 is divided into four image frame status groups M5, and the speech feature sequence V2 is divided into three speech frame status groups V5. A probability for mapping each speech frame status group V5 to each image frame status group M5 is 1, 1/10, 4/5, 1/10, 1/2, and 1/2 respectively. The mapping probability relations are recorded in the image-and-speech relation parameter 42. On the contrary, a probability for mapping each image frame status group M5 to each speech frame status group V5 is also recorded in the image-and-speech relation parameter 42 according to this mode.

Figure 5B:
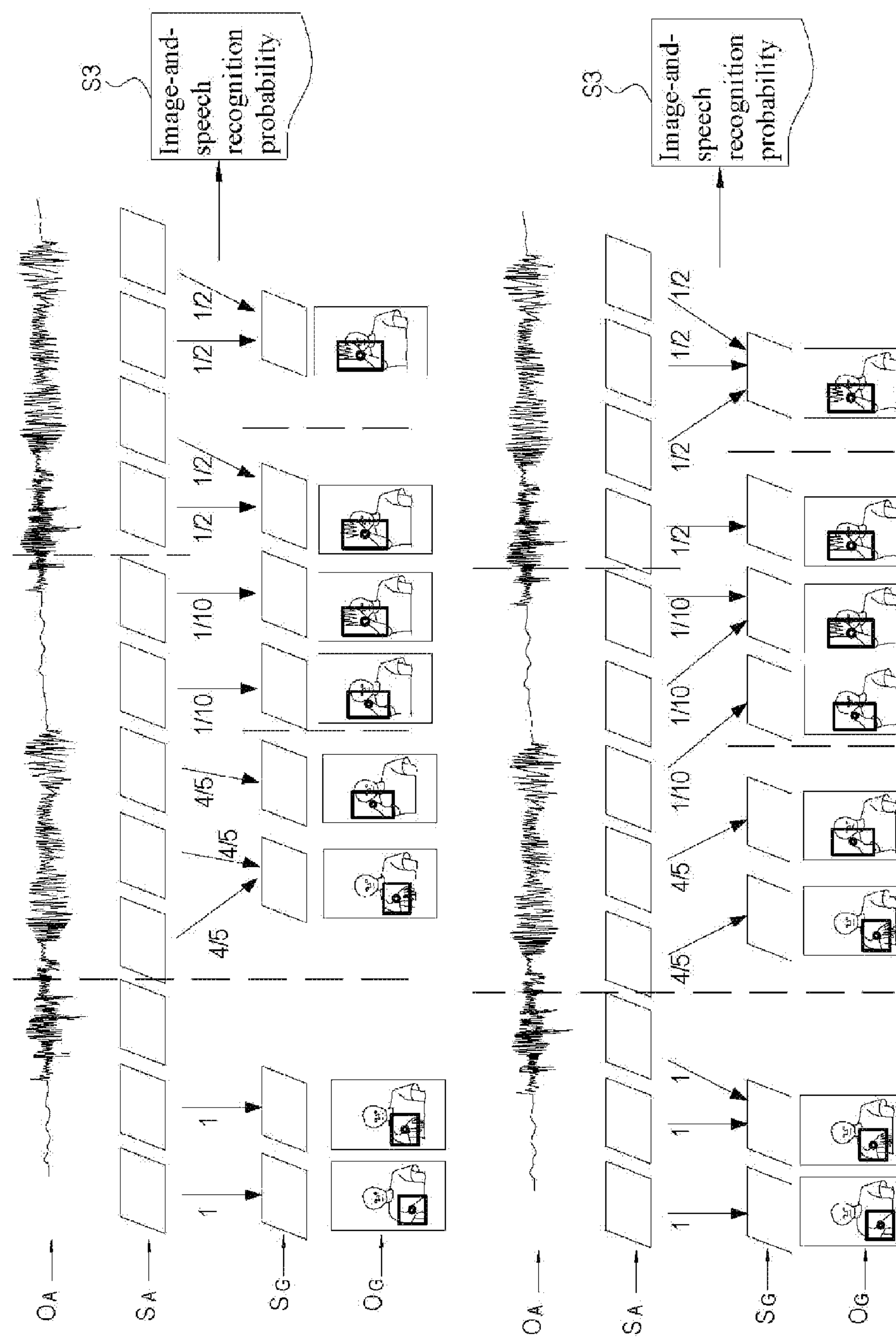
FIG. 5B is a schematic view of frame mapping relations and probability statistics according to an embodiment of the present invention.

FIG. 5B is a schematic view of frame mapping relations and probability statistics according to an embodiment of the present invention. The data analyzing module 31 performs a status mapping operation for mapping the speech frame status combination V4 to the image frame status combination M4 according to the above mapping mode of the status combinations. However, in fact, each speech frame status group V5 does not essentially include the same amount of speech frame data V3. Similarly, each image frame status group M5 does not essentially include the same amount of image frame data M3. Therefore, during the status relation calculation of the same speech frame status combination V4 and image frame status combination M4, a mapping relation between the speech frame data V3 and the image frame data M3 may include one-to-one, one-to-many, and many-to-one situations, thereby resulting in more than one frame mapping relation between each image frame status group M5 and each speech frame status group V5. When the data analyzing module 31 substitutes the image frame status group M5 and the speech frame status group V5 into the image-and-speech relation parameter 42, the data analyzing module 31 calculates more than one image-and-speech recognition probabilities S3 (including mapping the speech to the image and mapping the image to the speech) according to different frame mapping relations. As for the frame mapping operation for mapping the speech feature sequence V2 to the image feature sequence M2, two different image-and-speech recognition probabilities S3 are calculated, that is, and $$p(S_G|S_A,A)=1\times1\times1\times(4/5)\times(4/5)\times(4/5)\times(1/10)\times(1/10)\times(1/2)\times(1/2)\times(1/2)=0.00032;\text{ and} \tag{1}$$

$$p(S_G|S_A,A)=1\times1\times1\times(4/5)\times(4/5)\times(1/10)\times(1/10)\times(1/10)\times(1/2)\times(1/2)\times(1/2)=0.00004 \tag{2}$$

The data analyzing module 31 takes the maximum one, that is, 0.00004, to serve as an image-and-speech sub-status parameter S4 for mapping the speech feature sequence V2 to the image feature sequence M2.

Figure 5C:
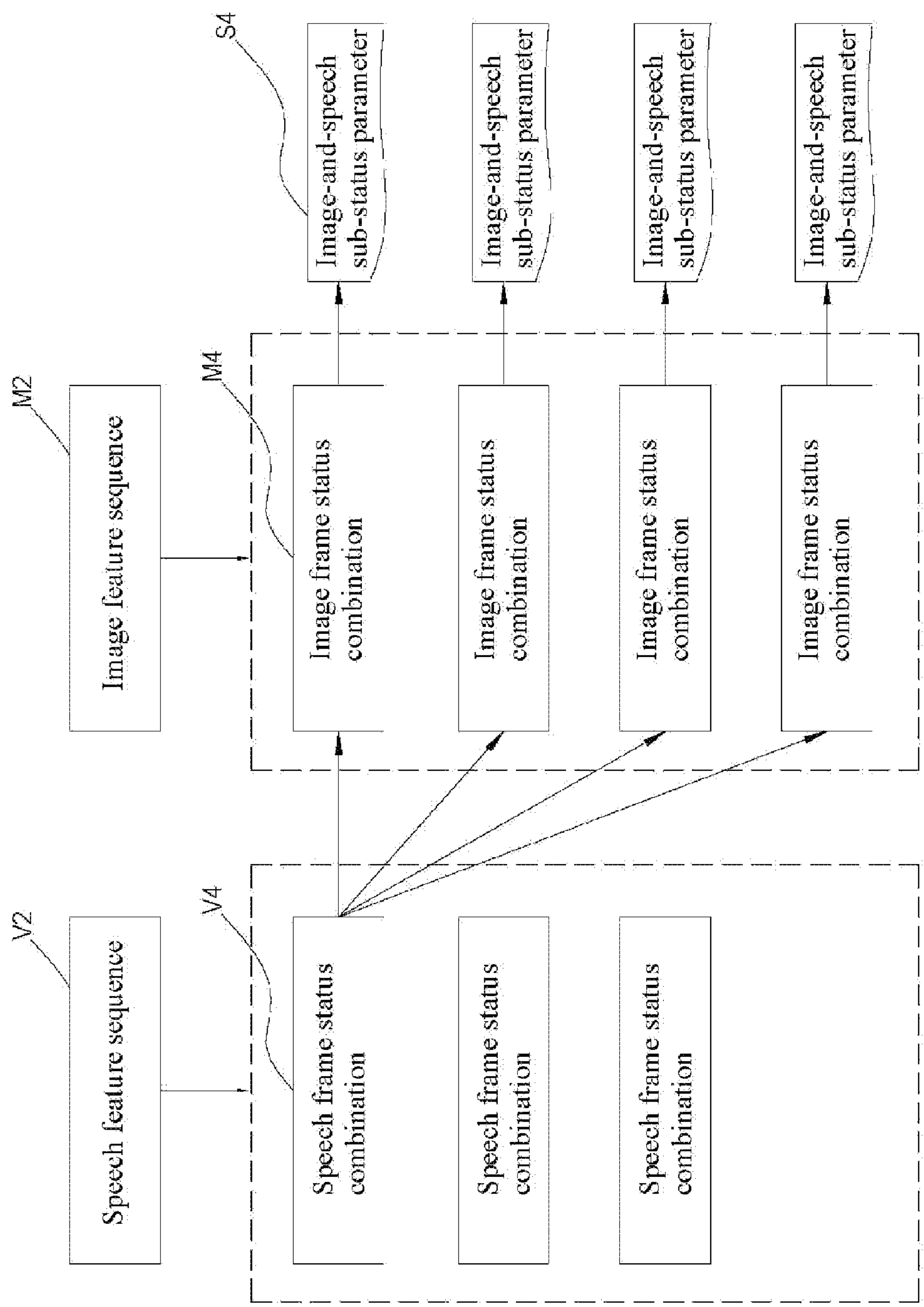
FIG. 5C is a schematic view of frame mapping relations and probability statistics according to an embodiment of the present invention.
Figure 5D:
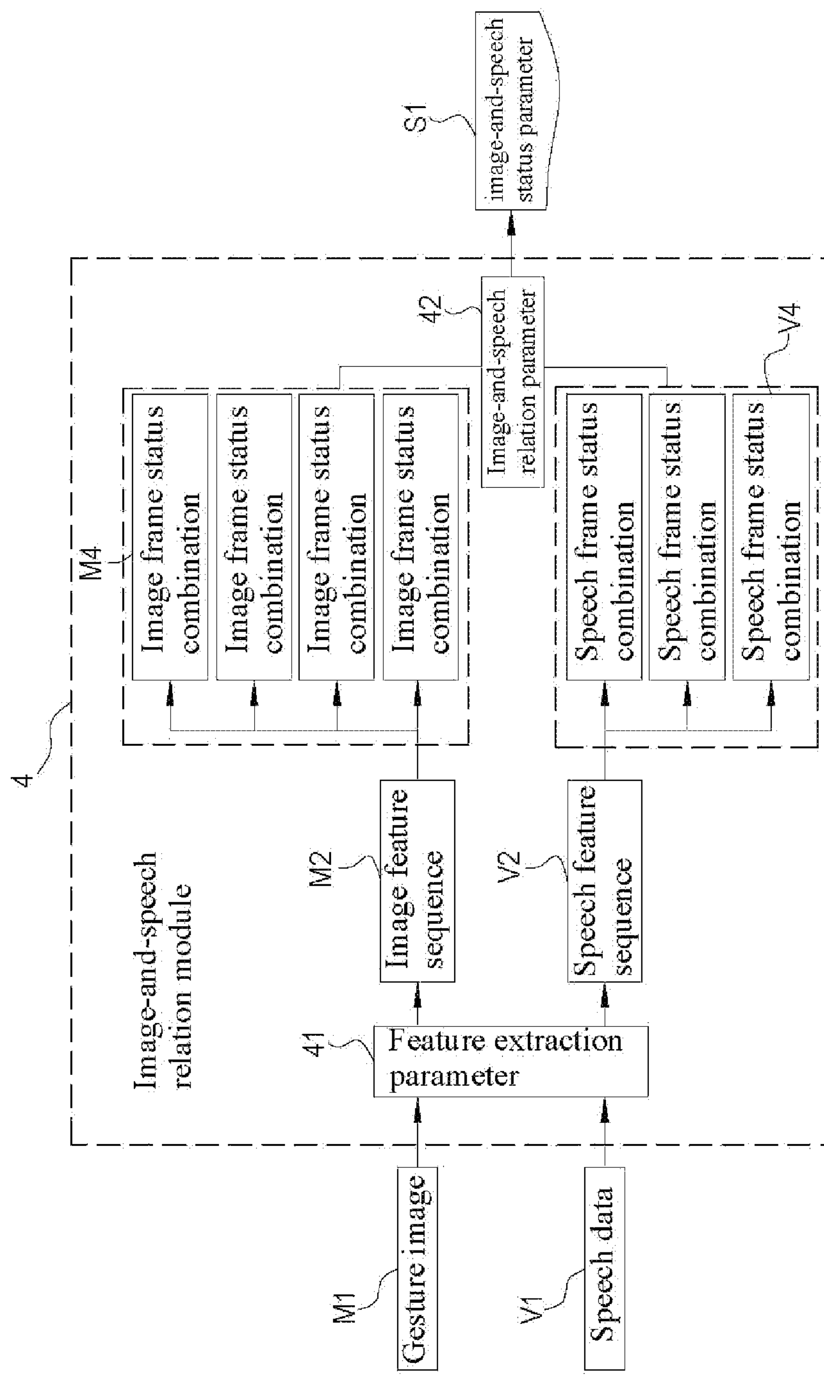
FIG. 5D is a schematic view of a substitution for image-and-speech relation parameters according to an embodiment of the present invention.

FIG. 5C is a schematic view of frame mapping relations and probability statistics according to an embodiment of the present invention, and FIG. 5D is a schematic view of a substitution for image-and-speech relation parameters 42 according to an embodiment of the present invention. In a situation of corresponding to the same image-and-speech relation module 4, the data analyzing module 31 calculates an image-and-speech sub-status parameter S4 for mapping each speech feature sequence V2 to each image feature sequence M2 and an image-and-speech sub-status parameter S4 for mapping each image feature sequence M2 to each speech feature sequence V2. As for FIG. 5C, the image feature sequence M2 is divided into four different image frame status combinations M4, and the speech feature sequence V2 is divided into three different speech frame status combinations V4, such that 12 (3*4) mapping relations exist between the image frame status combinations M4 and the speech frame status combinations V4, thereby resulting in 12 image-and-speech sub-status parameters S4. The data analyzing module 31 takes the maximum one among all the image-and-speech sub-status parameters S4 to serve as an image-and-speech status parameter S1 corresponding to the image-and-speech relation module 4 and then calculates the image-and-speech status parameter S1 corresponding to each image-and-speech relation module 4 through the operation modes shown in FIG. 4A to FIG. 5D in sequence.

The calculating module 33 substitutes the image-and-speech status parameter S1 of each image-and-speech relation module 4, the image feature sequences M2, and the speech feature sequences V2 into Equation 1 to calculate a recognition probability S2 corresponding to each image-and-speech relation module 4 and takes the maximum value among all the recognition probabilities to serve as the eventually selected target parameter T1. The image-and-speech relation module 4 where the target parameter T1 belongs to is what the user needs. Moreover, the image-and-speech relation module 4 further includes an execution command. When the system recognizes the user's motion and selects the corresponding image-and-speech relation module 4, the execution command included in the selected image-and-speech relation module 4 is executed to perform subsequent associated operations.

Figure 6A:
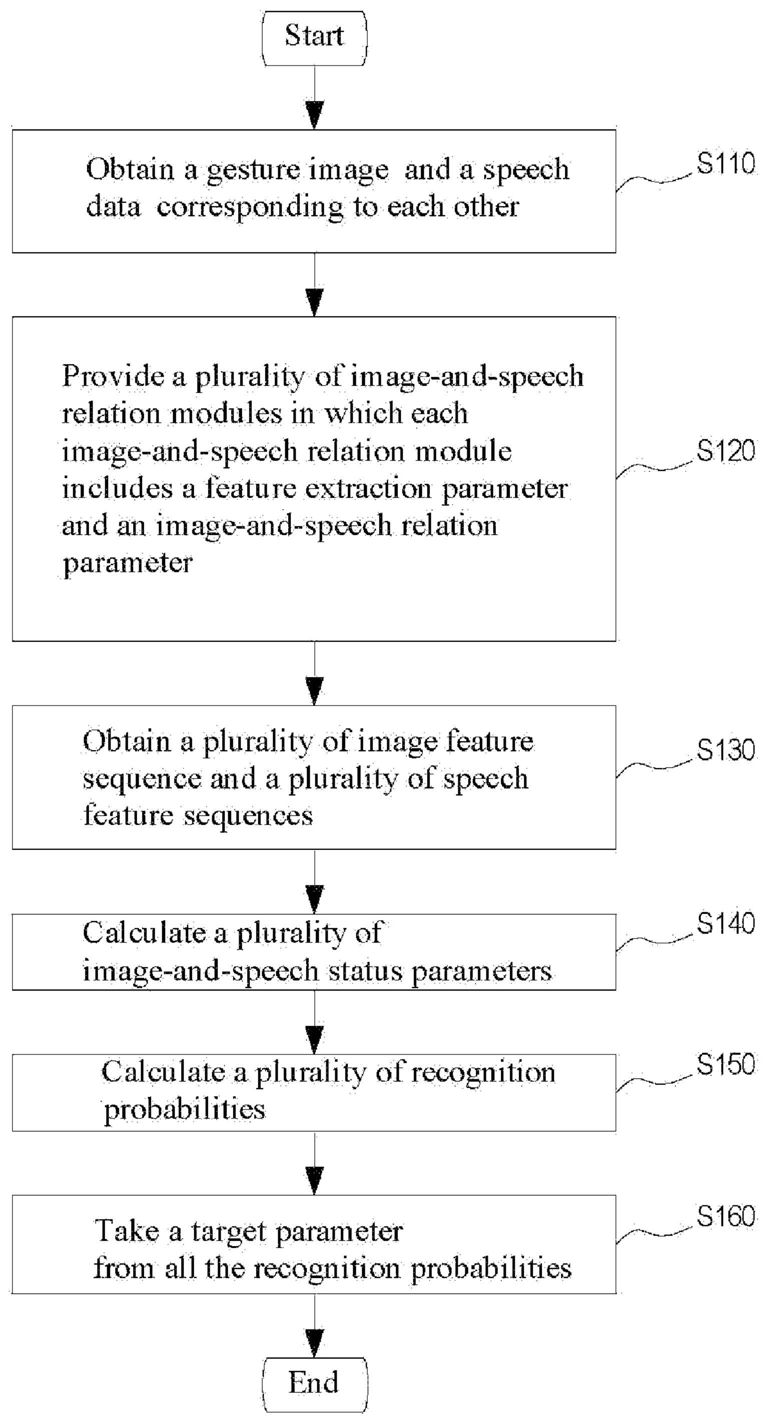
FIG. 6A is a schematic flow chart of a behavior recognition method according to an embodiment of the present invention.
Figure 6B:
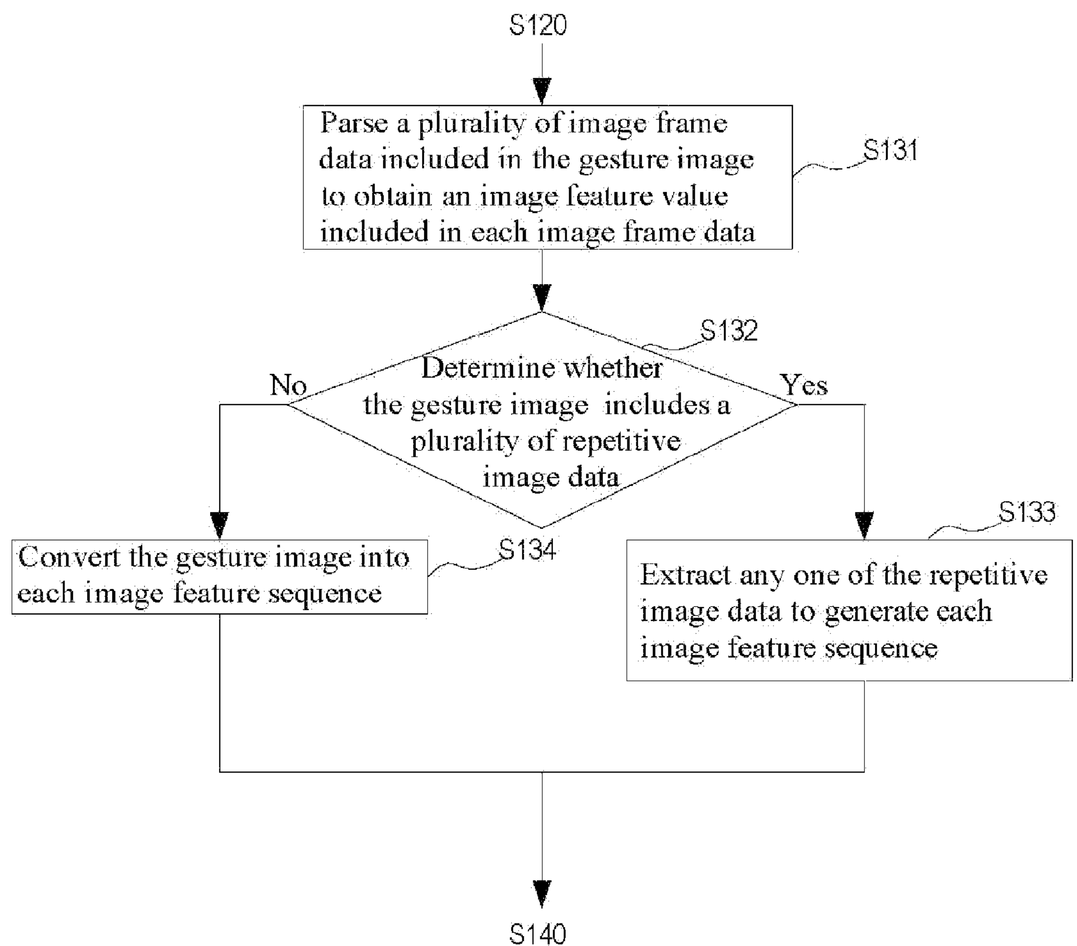
FIGS. 6B to 6E are detailed schematic flow charts of a behavior recognition method by combining an image and a speech according to an embodiment of the present invention.
Figure 6C:
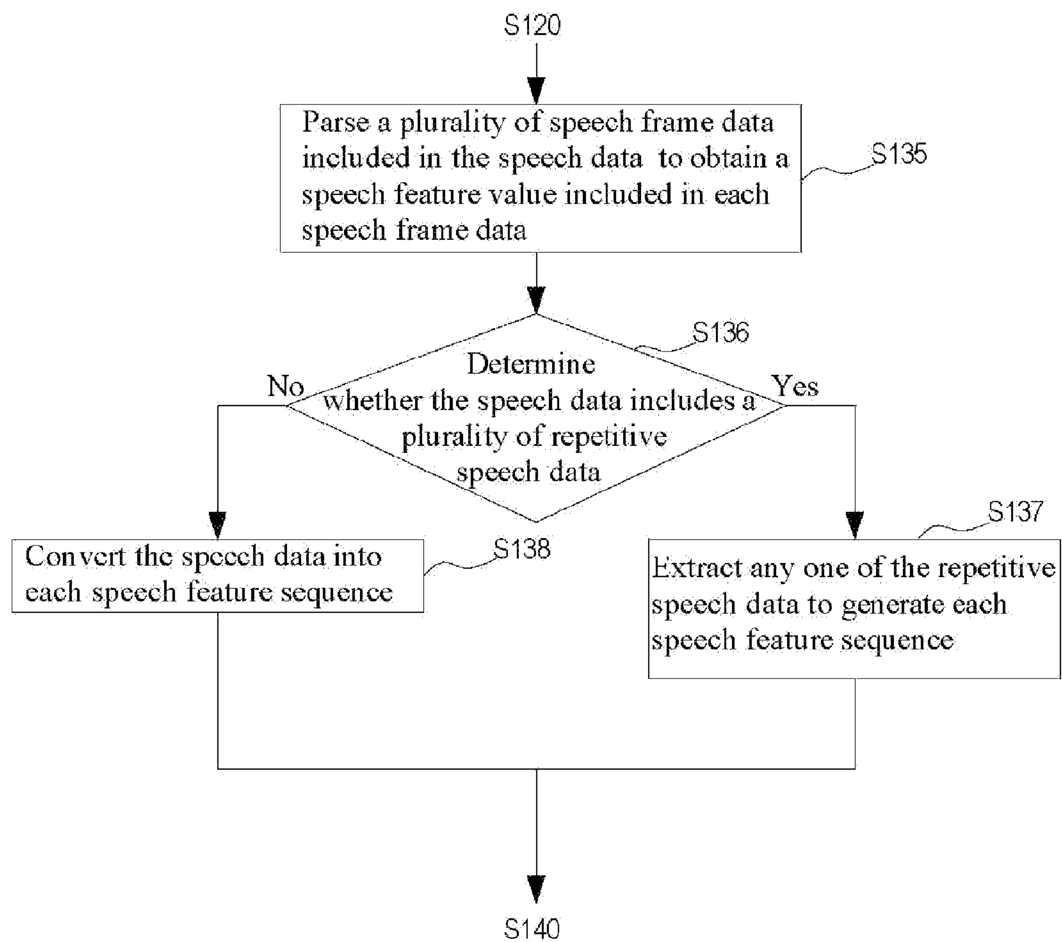
Figure 6D:
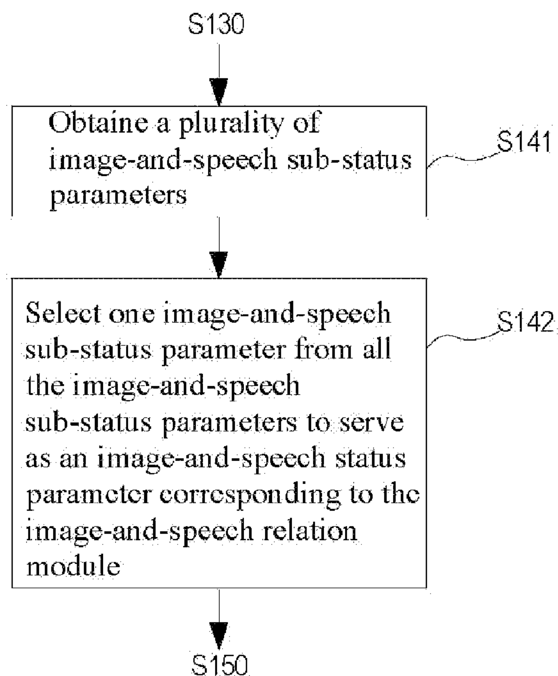
Figure 6E:
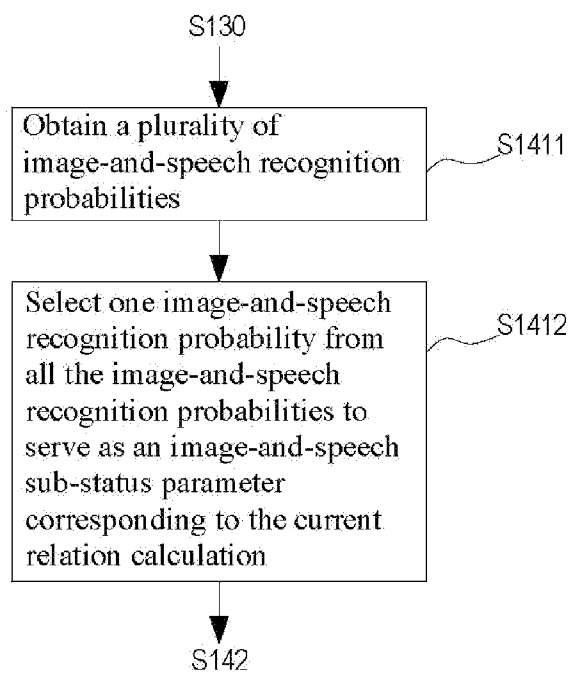

FIG. 6A is a schematic flow chart of a behavior recognition method by combining an image and a speech according to an embodiment of the present invention. FIGS. 6B to 6E are detailed schematic flow charts of a behavior recognition method by combining an image and a speech according to an embodiment of the present invention. Refer to FIGS. 2A to 5D at the same time for ease of understanding. The process of the behavior recognition method is described as follows.

A gesture image M1 and a speech data V1 corresponding to each other are obtained (Step S110). The gesture image M1 is generated after a camera module 11 shoots a gesture motion of the user. The speech data V1 is generated after a microphone 12 receives a sound made by the user. The gesture image M1 and the speech data V1 are image-and-speech input data in pairs.

A plurality of image-and-speech relation modules 4 are provided, and each image-and-speech relation module 4 includes a feature extraction parameter 41 and an image-and-speech relation parameter 42 (Step S120). All the image-and-speech relation modules 4 are constructed in advance and stored in a database 32. In this embodiment, each image-and-speech relation module 4 corresponds to one human behavior or motion.

A plurality of image feature sequences M2 and a plurality of speech feature sequences V2 are obtained (Step S130). Specifically, a data analyzing module 31 substitutes the gesture image M1 and the speech data V1 corresponding to each other into each feature extraction parameter 41 to generate a plurality of image feature sequences M2 and a plurality of speech feature sequences V2. The detailed operation procedures are described as follows.

The data analyzing module 31 first parses a plurality of image frame data M3 included in the gesture image M1, so as to obtain an image feature value included in each image frame data M3 (Step S131).

It is determined whether the gesture image M1 includes a plurality of repetitive image data by using all the image feature values (Step S132). The data analyzing module 31 analyzes an image feature value of each image frame data M3 in the gesture image M1, and calculates a pattern and a position of a gesture of the user in each image frame data M3, so as to calculate a moving track of the gesture. Next, the data analyzing module 31 utilizes an autocorrelation function to compute more than one repetitive image data included in the gesture image M1. The autocorrelation function is shown as follows.

$$r_{xx}(k) = \frac{1}{M}\sum_{n=1}^{M} x(n)\cdot x(n+k) \quad \text{(Equation 2)}$$

In the above equation, $r_{xx}(k)$ is an autocorrelation function value for the time displacement k; x(n) is an input parameter for the time n; k is the time displacement; and M is a total amount of the gesture images M1. When the data analyzing module 31 determines that the gesture image M1 includes a plurality of repetitive image data, the data analyzing module 31 extracts any one of the repetitive image data to generate each image feature sequence M2 (Step S133). On the contrary, when the gesture image M1 includes no repetitive image data, the data analyzing module 31 directly converts the gesture image M1 into each image feature sequence M2 (Step S134).

As for the parsing of the speech data V1, the data analyzing module 31 first parses a plurality of speech frame data V3 included in the speech data V1, so as to obtain a speech feature value included in each speech frame data V3 (Step S135). It is determined whether the speech data V1 includes a plurality of repetitive speech data by using all the speech feature values (Step S136). The data analyzing module 31 converts each speech feature value into an MFCC to calculate changes of the speech feature of the user in each speech frame data V3, uses Equation 2 to analyze whether the speech data V1 includes more than one repetitive speech data. When the data analyzing module 31 determines that the speech data V1 includes more than one repetitive speech data, the data analyzing module 31 extracts any one of the repetitive speech data to generate each speech feature sequence V2 (Step S137). Otherwise, the data analyzing module 31 converts the speech data V1 into each speech feature sequence V2 (Step S138).

A plurality of image-and-speech status parameters S1 is calculated (Step S140). The data analyzing module 31 substitutes each image feature sequence M2 and each speech feature sequence V2 corresponding to the same image-and-speech relation module 4 into each image-and-speech relation parameter 42, so as to calculate a plurality of image-and-speech status parameters S1. The Step S140 includes a plurality of detailed procedures.

A plurality of image-and-speech sub-status parameters S4 is obtained (Step S141). The Step S141 includes a plurality of detailed procedures.

A plurality of image-and-speech recognition probabilities S3 is obtained (Step S1411). As shown in FIGS. 4A to 5D, each image feature sequence M2 includes a plurality of image frame data M3, and each speech feature sequence V2 includes a plurality of speech frame data V3. The data analyzing module 31 performs initialization on the image feature sequences M2 and the speech feature sequences V2, that is, equally divides each image feature sequence M2 and each speech feature sequence V2. In this embodiment, the image feature sequence M2 is divided into three equal parts, and the speech feature sequence V2 is divided into four equal parts. The data analyzing module 31 utilizes a HMM to perform training on the image feature sequence M2, so as to plan image frame status combinations M4 in various different division modes. In this embodiment, regardless of the division mode used, the image feature sequence M2 is divided into three image frame status groups M5, and each image frame status group M5 includes more than one image frame data M3. However, the present invention is not limited thereto, and the image feature sequence M2 may also be divided into different amount of image frame status groups M5 such as two, four, five, or six image frame status groups M5. Next, the data analyzing module 31 utilizes the HMM to perform training on the speech feature sequence V2, so as to plan a plurality of speech frame status combinations V4 in various different division modes. In this embodiment, regardless of the division mode used, the speech feature sequence V2 is divided into four speech frame status groups V5, and each speech frame status group V5 includes more than one speech frame data V3. However, the present invention is not limited thereto, and the speech feature sequence V2 may also be divided into different amount of speech frame status groups V5 such as two, three, five, or six speech frame status groups V5. It should be noted that, the speech frame status combinations V4 are division results obtained by performing division on the same speech feature sequence V2 in different manners. However, the speech frame data V3 included in the speech feature sequence V2 maintains unchanged. Similarly, the image frame status combinations M4 are division results obtained by performing division on the same image feature sequence M2 in different manners. However, the image frame data M3 included in the image feature sequence M2 maintains unchanged. Subsequently, the data analyzing module 31 utilizes a Viterbi algorithm to perform HMM training on the image feature sequences M2 and the speech feature sequences V2, so as to find out the speech frame status group V5/image frame status group M5 where each speech frame data V3/image frame data M3 exists at different time points.

Each image-and-speech relation module 4 includes an image-and-speech relation parameter 42, which records a probability parameter for mapping each image frame status combination M4 to each speech frame status combination V4 and a probability parameter for mapping each speech frame status combination V4 to each image frame status combination M4 as for the image feature sequences M2 and the speech feature sequences V2 corresponding to the same image-and-speech relation module 4.

In this embodiment, the data analyzing module 31 performs a status mapping operation for mapping the speech frame status combination V4 to the image frame status combination M4 according to the above mapping mode of the status combinations. However, in fact, each speech frame status group V5 does not essentially include the same amount of speech frame data V3. Similarly, each image frame status group M5 does not essentially include the same amount of image frame data M3. Therefore, during the status relation calculation of the same speech frame status combination V4 and image frame status combination M4, a mapping relation between the speech frame data V3 and the image frame data M3 may include one-to-one, one-to-many, and many-to-one situations, thereby resulting in more than one frame mapping relation between each image frame status group M5 and each speech frame status group V5. When the data analyzing module 31 substitutes the image frame status group M5 and the speech frame status group V5 into the image-and-speech relation parameter 42, the data analyzing module 31 calculates more than one image-and-speech recognition probabilities S3 (including mapping the speech to the image and mapping the image to the speech) according to different frame mapping relations.

One image-and-speech recognition probability is selected from all the image-and-speech recognition probabilities S3 to serve as an image-and-speech sub-status parameter S4 corresponding to the current relation calculation (Step S1412). The data analyzing module 31 takes the maximum value from all the image-and-speech recognition probabilities S3 to serve as the image-and-speech sub-status parameter S4 for mapping the speech feature sequence V2 to the image feature sequence M2 currently. In the same manner, the data analyzing module 31 calculates image-and-speech sub-status parameters S4 corresponding to all combinations of the speech feature sequences V2 and the image feature sequences M2.

One image-and-speech sub-status parameter is selected from all the image-and-speech sub-status parameters S4 to serve as an image-and-speech status parameter S1 corresponding to the image-and-speech relation module 4 (Step S142). In the situation of corresponding to the same image-and-speech relation module 4, the data analyzing module 31 calculates an image-and-speech sub-status parameter S4 for mapping each speech feature sequence V2 to each image feature sequence M2 and an image-and-speech sub-status parameter S4 for mapping each image feature sequence M2 to each speech feature sequence V2. The maximum value among all the image-and-speech sub-status parameters S4 is taken as the image-and-speech status parameter S1 corresponding to the image-and-speech relation module 4. An image-and-speech status parameter S1 corresponding to each image-and-speech relation module 4 is calculated through the operation modes in FIGS. 4A to 5D in sequence.

A plurality of recognition probabilities S2 is calculated (Step S150). The calculating module 33 substitutes the image-and-speech status parameter S1 of each image-and-speech relation module 4, the image feature sequences M2, and the speech feature sequences V2 into Equation 1 to calculate a recognition probability S2 corresponding to each image-and-speech relation module 4. Calculation equations used by the calculating module 33 are listed as follows.

$$
\begin{aligned}
(G^*, A^*) &= \operatorname*{argmax}_{G,A} p(O_G, O_A, S_G, S_A \mid G, A) \\
&\approx \operatorname*{argmax}_{G,A} p(O_G, S_G, S_A \mid G) p(O_A, S_G, S_A \mid A) \\
&= \operatorname*{argmax}_{G,A} p(O_G, S_G \mid G) p(S_A \mid S_G, O_G, G) \\
&\quad p(S_G \mid S_A, O_A, A) p(O_A, S_A \mid A) \\
&\approx \operatorname*{argmax}_{G,A} p(O_G, S_G \mid G) p(S_A \mid S_G, G) \\
&\quad p(S_G \mid S_A, A) p(O_A, S_A \mid A)
\end{aligned}
$$

In the above equations, (G,A) is a gesture and speech model in the same motion category; $p(O_G,S_G|G)$ is a recognition model of a gesture image M1; $p(S_A|S_G,G)$ is an image-and-speech sub-status parameter for mapping the speech feature sequence $S_A$ to the gesture model G after a certain image feature sequence $S_G$ is given; $p(O_A,S_A|A)$ is a recognition model of a speech instruction; and $p(S_G|S_A,A)$ is an image-and-speech sub-status parameter for mapping the image feature sequence $S_G$ to the speech instruction model A after the speech feature sequence $S_A$ is given.

A target parameter T1 is taken from all the recognition probabilities S2 (Step S160). The data analyzing module 31 takes a maximum value from all the recognition probabilities S2 to serve as the eventually selected target parameter T1. The image-and-speech relation module 4 where the target parameter T1 belongs to is what the user needs.

Figure 7:
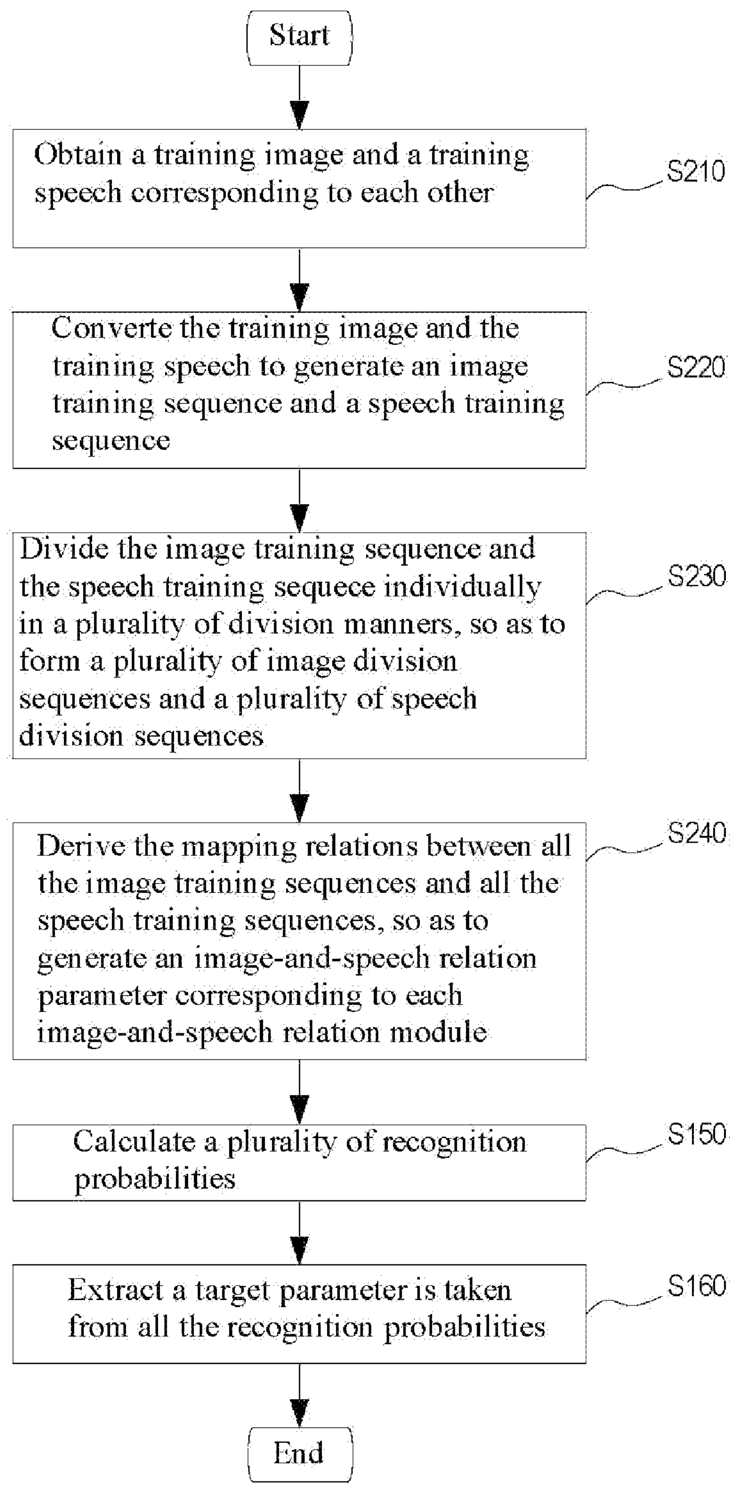
FIG. 7 is a flow chart of establishing an image-and-speech relation module according to an embodiment of the present invention.

FIG. 7 is a flow chart of a method for establishing an image-and-speech relation module 4 according to an embodiment of the present invention, which shows how the image-and-speech relation module 4 is trained and established. Referring to FIGS. 8A to 8D at the same time for ease of understanding, the process of the method for establishing the image-and-speech relation module 4 is illustrated as follows.

A training image MT1 and a training speech VT1 corresponding to each other are obtained (Step S210). The training image MT1 is generated after a camera module 11 shoots a gesture motion of the user. The training speech VT1 is generated after a microphone 12 receives a sound made by the user. The training image MT1 and the training speech VT1 are image-and-speech input data in pairs.

The training image MT1 and the training speech VT1 are converted to generate an image training sequence MT2 and a speech training sequence VT2 (Step S220). The data analyzing module 31 analyzes an image feature value of each training image frame MT3 in the training image MT1, and calculates a pattern and a position of a gesture of the user in each training image frame MT3, so as to calculate a moving track of the gesture. Next, the data analyzing module 31 utilizes an autocorrelation function (Equation 2) to compute more than one repetitive image data included in the training image MT1 and extracts any one of the repetitive image data.

In addition, the data analyzing module 31 analyzes a speech feature value of each training speech frame VT3 in the training speech VT1, converts each speech feature value into an MFCC to calculate changes of the speech feature of the user in each training speech frame VT3, uses Equation 2 to find out more than one repetitive speech data included in the training speech VT1, and extracts any one of the repetitive speech data.

Figure 8A:
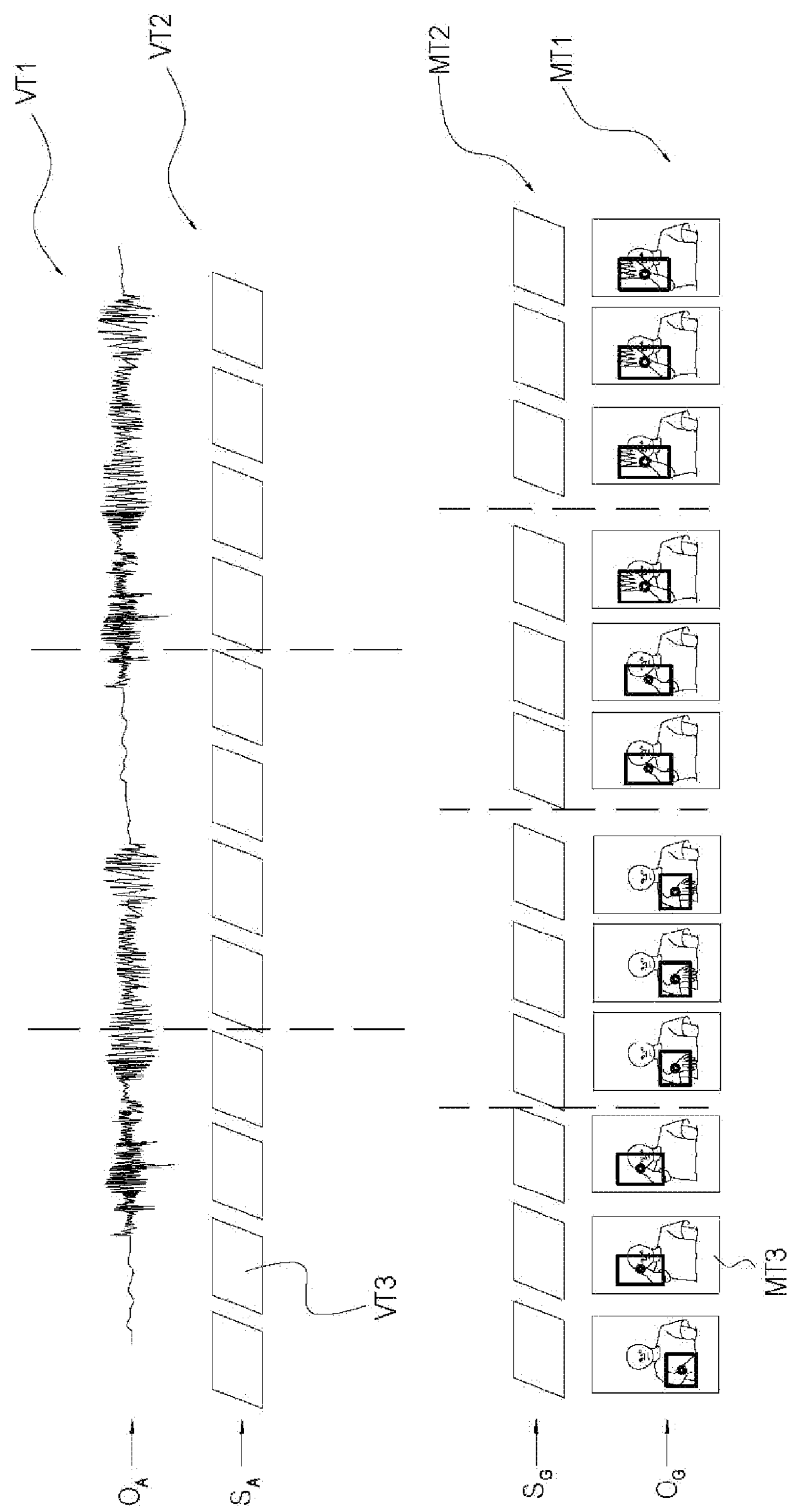
FIG. 8A is a schematic view of training data initialization according to an embodiment of the present invention.

The image training sequence MT2 and the speech training sequence VT2 are individually divided in a plurality of division manners, so as to form a plurality of image division sequences and a plurality of speech division sequences (Step S230). Referring to FIG. 8A, the data analyzing module 31 performs initialization on the image training sequence MT2 and the speech training sequence VT2, that is, equally divides the image training sequence MT2 and the speech training sequence VT2. In this embodiment, the image training sequence MT2 is divided into three equal parts, and the speech training sequence VT2 is divided into four equal parts.

Figure 8B:
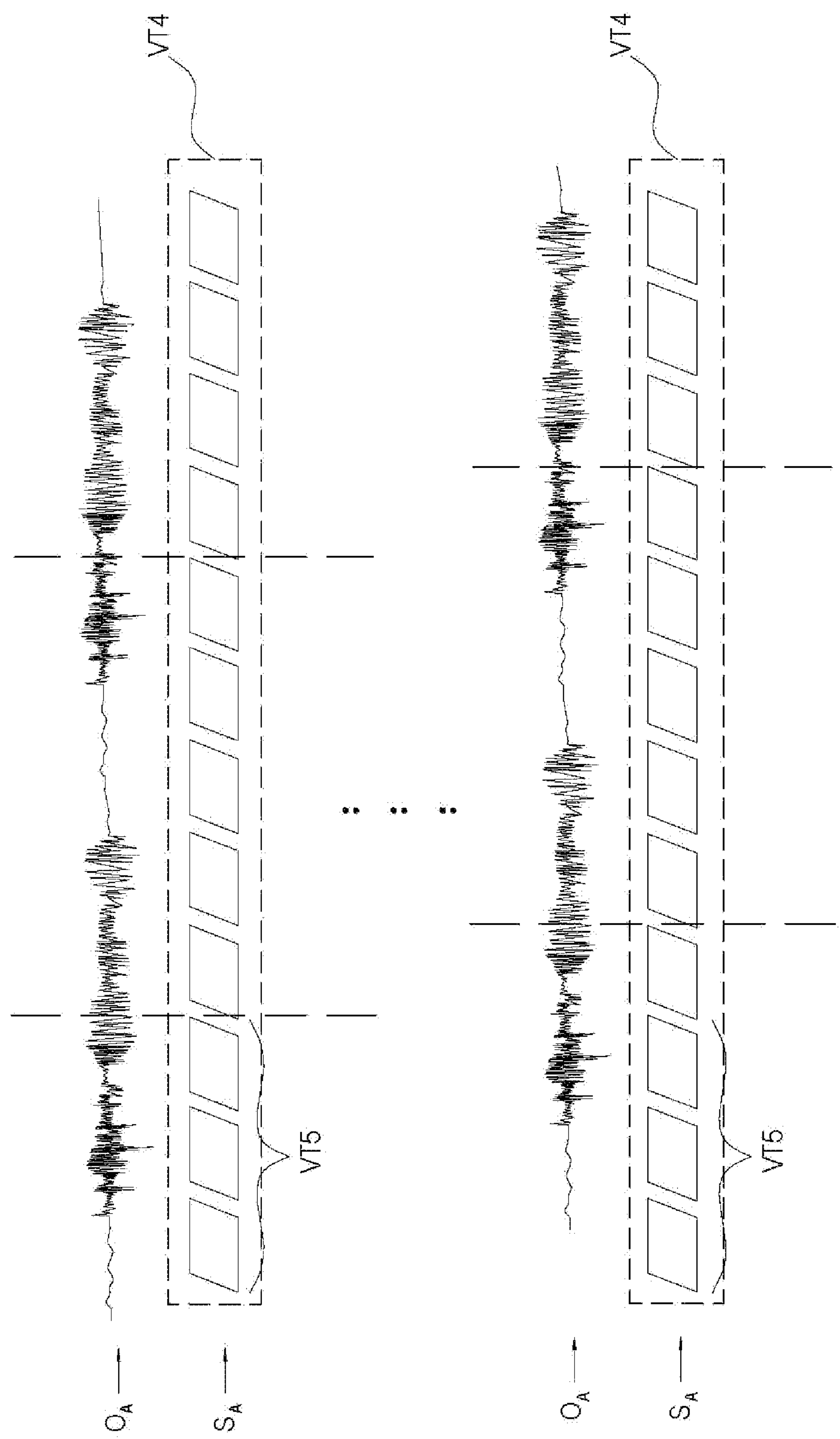
FIG. 8B is a schematic view of speech training sequence division according to an embodiment of the present invention.

As shown in FIG. 8B, the data analyzing module 31 utilizes the HMM to perform training on the speech training sequence VT2, so as to plan a plurality of speech frame training combinations VT4 in various different division modes.

Figure 8C:
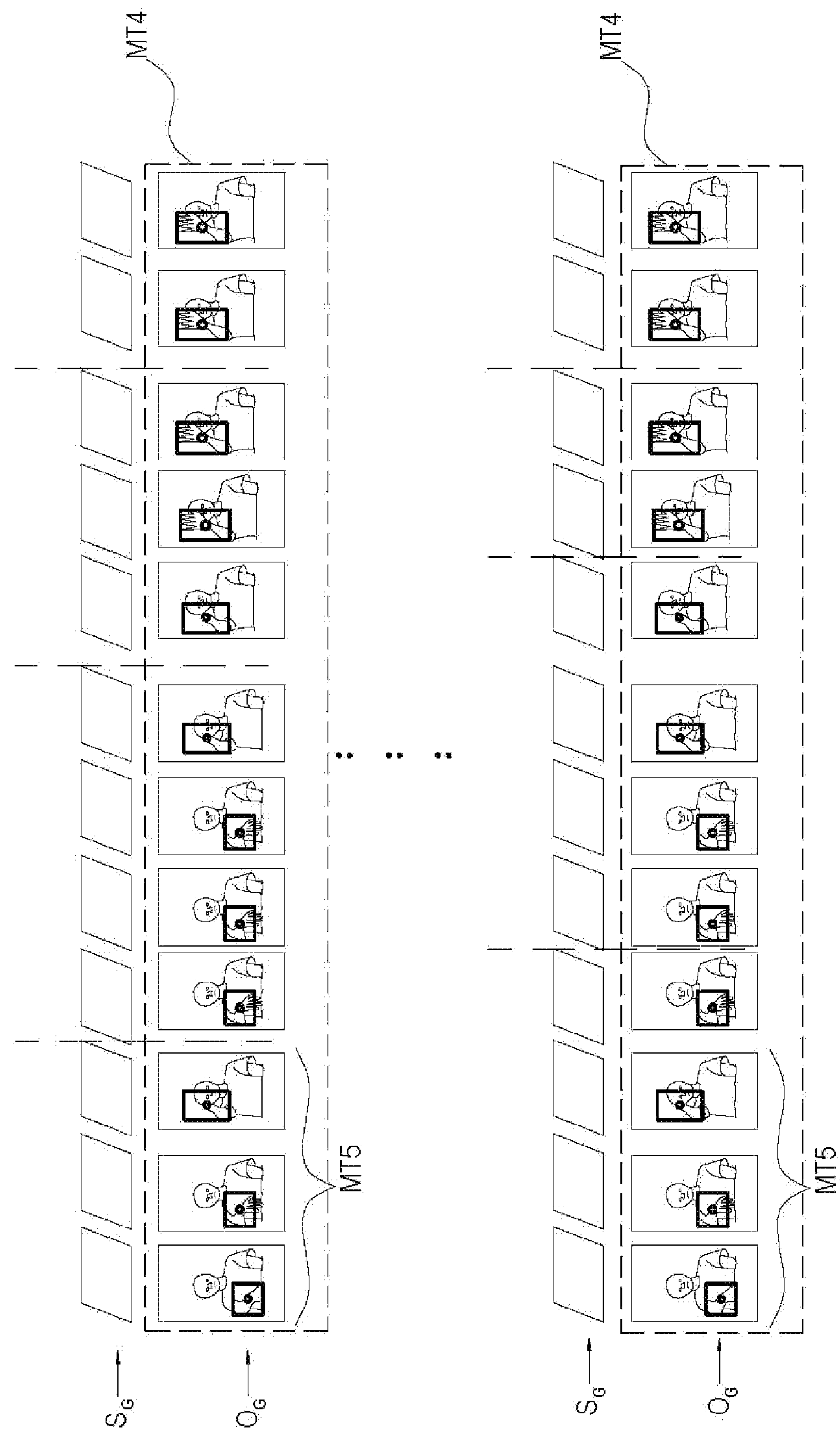
FIG. 8C is a schematic view of image training sequence division according to an embodiment of the present invention.

As shown in FIG. 8C, the data analyzing module 31 further utilizes the HMM to perform training on the image training sequence MT2, so as to plan a plurality of image frame training combinations MT4 in various different division modes.

In this embodiment, regardless of the division mode used, the image training sequence MT2 is divided into three image frame training groups 5, and each image frame training group MT5 includes more than one training image frame MT3. The speech training sequence VT2 is divided into four speech frame training groups VT5, and each speech frame training group VT5 includes more than one training speech frame VT3. However, the present invention is not limited thereto.

Figure 8D:
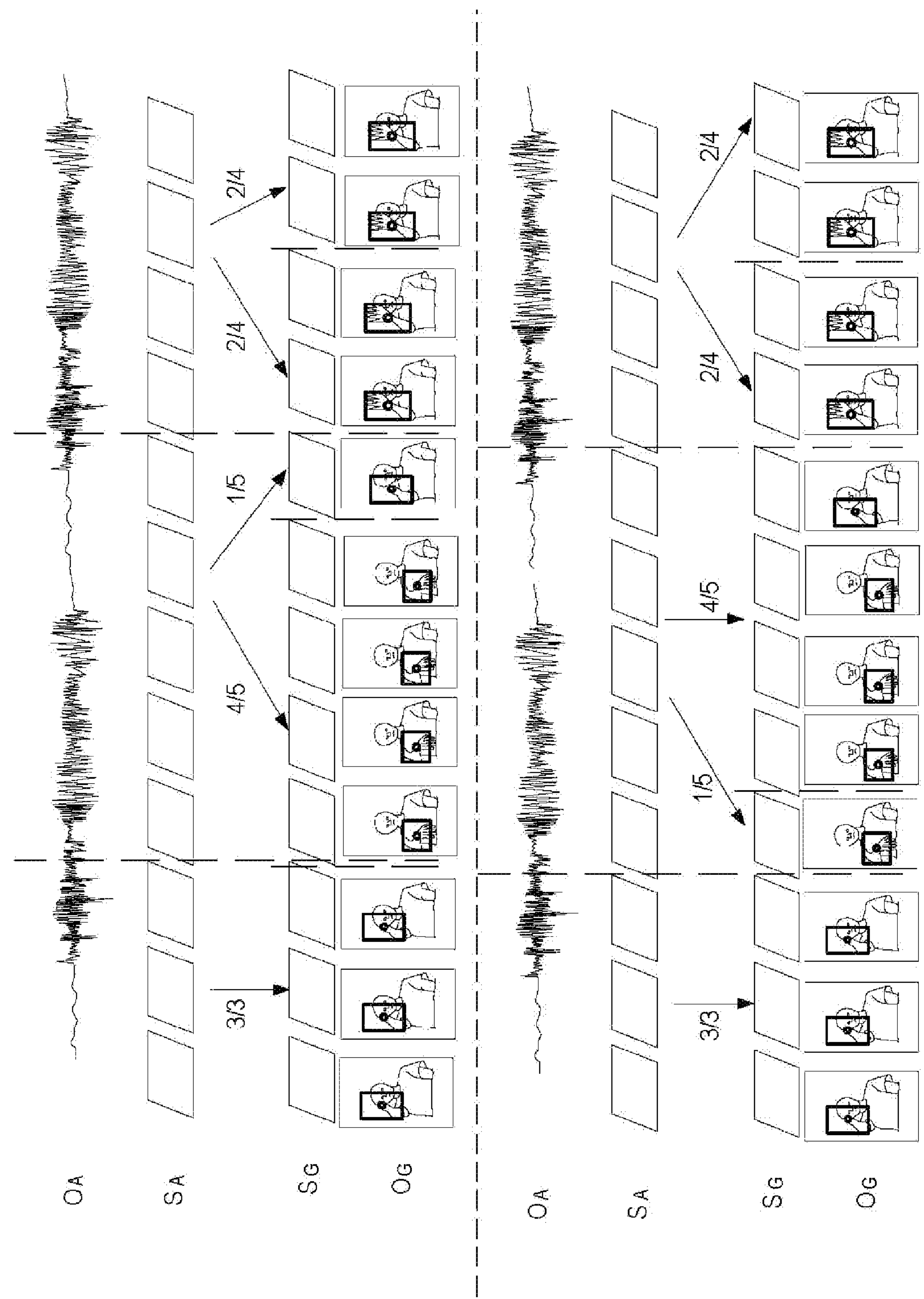
FIG. 8D is a schematic view of matching the training combinations according to an embodiment of the present invention.

Referring to FIG. 8D, the data analyzing module 31 matches each speech frame training combination VT4 with the image frame training combination MT4 individually. For example, the speech frame training combination VT4 includes 5 forms, and the image frame training combination MT4 includes 6 forms, so that the mapping relations for mapping the speech frame training combination VT4 to the image frame training combination MT4 individually include 5*6=30 forms.

Mapping relations between all the image training sequences MT2 and all the speech training sequences VT2 are derived, so as to generate an image-and-speech relation parameter 42 corresponding to each image-and-speech relation module 4 (Step S240).

Referring to FIG. 8D, each image training sequence MT2 is divided into four image frame training groups 5, and each speech training sequence VT2 is divided into three speech frame training groups VT5. The data analyzing module 31 calculates an individual probability of each image frame training group MT5 and each speech frame training group VT5 in each mapping relation form.

As for the mapping relations between the two training data shown in FIG. 8D, among the mapping relation modes between the speech frame training combinations VT4 and the image frame training combinations MT4 shown at the upper part of FIG. 8D, the probability for mapping each speech frame training group VT5 to each image frame training group MT5 is 3/3, 4/5, 1/5, 2/4, and 2/4 respectively.

Among the mapping relation modes between the speech frame training combinations VT4 and the image frame training combinations MT4 as shown at the lower part of FIG. 8D, the probability for mapping each speech frame training group VT5 to each image frame training group MT5 is 3/3, 1/5, 4/5, 2/4, and 2/4 respectively.

Next, the data analyzing module 31 performs probability integration on the two mapping relations and finds out an individual probability for mapping each speech frame training group VT5 to the image frame training group MT5 and an individual probability for mapping each image frame training group MT5 to the speech frame training group VT5, so as to form the image-and-speech relation parameter 42 as shown in FIG. 5C, that is, $p(O_G,S_G|G)p(S_G,S_A|A)$ represented in Equation 1.

In addition, the data analyzing module 31 records a feature extraction mode of the training image MT1 and the training speech VT1 as a feature extraction parameter 41 of each image-and-speech relation module 4 (Step S250). Finally, the data analyzing module 31 records the feature extraction parameter 41 and the image-and-speech relation parameter 42 to form each image-and-speech relation module 4 according to different motions and behaviors (Step S260), and stores all the image-and-speech relation modules 4 in the database 32.

To sum up, the implementation manners or embodiments of the technical measures for solving the problems are described, which are not intended to limit the scope of the implementation of the present invention. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A behavior recognition system by combining an image and a speech, comprising:

a database, for storing a plurality of image-and-speech relation modules, wherein each of the image-and-speech relation modules comprises a feature extraction parameter and an image-and-speech relation parameter;

a data analyzing module, for substituting a gesture image and a speech data corresponding to each other into each feature extraction parameter to obtain a plurality of image feature sequences and a plurality of speech feature sequences, and substituting each image feature sequence and each speech feature sequence corresponding to a same image-and-speech relation module into each image-and-speech relation parameter, so as to calculate a plurality of image-and-speech status parameters, wherein each image feature sequence comprises a plurality of image frame data, and the image frame data forms a plurality of image frame status combinations; each speech feature sequence comprises a plurality of speech frame data, and the speech frame data forms a plurality of speech frame status combinations, when the data analyzing module calculates each one of the image-and-speech status parameters, the data analyzing module substitutes each image frame status combination and each speech frame status combination into the image-and-speech relation parameter corresponding to the same image-and-speech relation module to calculate a plurality of image-and-speech sub-status parameters and selects one image-and-speech sub-status parameter from the plurality of image-and-speech sub-status parameters to serve as the image-and-speech status parameter corresponding to the image-and-speech relation module; and a calculating module, for using the image feature sequences, the speech feature sequences, and the image-and-speech status parameters to calculate a recognition probability corresponding to each of the image-and-speech relation modules, and taking a target parameter from the recognition probabilities.

2. The behavior recognition system by combining an image and a speech according to claim 1, wherein the data analyzing module utilizes a hidden Markov model (HMM) to perform training on the speech feature sequence and the image feature sequence to form the speech frame status combinations and the image frame status combinations respectively.

3. The behavior recognition system by combining an image and a speech according to claim 1, wherein the image-and-speech status parameter is one image-and-speech sub-status parameter with a maximum value among the plurality of image-and-speech sub-status parameters.

4. The behavior recognition system by combining an image and a speech according to claim 1, wherein each image feature sequence comprises a plurality of image frame status groups, each speech feature sequence comprises a plurality of speech frame status groups, and the feature extraction parameter records a probability parameter for mapping each image frame status group to each speech frame status group and a probability parameter for mapping each speech frame status group to each image frame status group under a condition of corresponding to the same image-and-speech relation module.

5. The behavior recognition system by combining an image and a speech according to claim 4, wherein a frame mapping relation exists between each image frame status group and each speech frame status group, and in one relation calculation of substituting the image feature sequence and the speech feature sequence into the image-and-speech relation parameter, the data analyzing module substitutes the image frame status groups and the speech frame status groups into the image-and-speech relation parameter corresponding to the same image-and-speech relation module to calculate a plurality of image-and-speech recognition probabilities according to types of the frame mapping relation, and selects one image-and-speech recognition probability having a maximum value from the plurality of image-and-speech recognition probabilities to serve as the image-and-speech sub-status parameter corresponding to the relation calculation.

6. The behavior recognition system by combining an image and a speech according to claim 1, wherein the gesture image comprises a plurality of image frame data, each image frame data comprises an image feature value, and the data analyzing module uses the image feature values to determine that the gesture image comprises a repetitive image data and extracts any one of the repetitive image data to generate each image feature sequence.

7. The behavior recognition system by combining an image and a speech according to claim 1, wherein the speech data comprises a plurality of speech frame data, each speech frame data comprises a speech feature value, and the data analyzing module uses the speech feature values to determine that the speech data comprises a repetitive speech data and extracts any one of the repetitive speech data to generate each speech feature sequence.

8. The behavior recognition system by combining an image and a speech according to claim 1, wherein the target parameter is the recognition probability with a maximum value among the recognition probabilities.

9. A behavior recognition method by combining an image and a speech, comprising:

obtaining a gesture image and a speech data corresponding to each other;

providing a plurality of image-and-speech relation modules, wherein each of the image-and-speech relation modules comprises a feature extraction parameter and an image-and-speech relation parameter;

obtaining a plurality of image feature sequences and a plurality of speech feature sequences, wherein the gesture image and the speech data are individually substituted into the feature extraction parameters, so as to calculate the image feature sequences and the speech feature sequences, wherein each image feature sequence comprises a plurality of image frame data, and the image frame data forms a plurality of image frame status combinations; each speech feature sequence comprises a plurality of speech frame data, and the speech frame data forms a plurality of speech frame status combinations;

calculating a plurality of image-and-speech status parameters, wherein each image feature sequence and each speech feature sequence corresponding to a same image-and-speech relation module are substituted into each image-and-speech relation parameter, so as to obtain the image-and-speech status parameters, wherein the step of calculating each one of the image-and-speech status parameters comprises;

obtaining a plurality of image-and-speech sub-status parameters, wherein each image frame status combination and each speech frame status combination are substituted into the image-and-speech relation parameter corresponding to the same image-and-speech relation module, so as to calculate the image-and-speech sub-status parameters; and selecting one image-and-speech sub-status parameter from the image-and-speech sub-status parameters to serve as the image-and-speech status parameter corresponding to the image-and-speech relation module;

calculating a plurality of recognition probabilities, wherein the image feature sequences, the speech feature sequences, and the image-and-speech status parameters are used to calculate a recognition probability corresponding to each of the image-and-speech relation modules; and taking a target parameter from the recognition probabilities.

10. The behavior recognition method by combining an image and a speech according to claim 9, wherein the speech frame status combinations and the image frame status combinations are generated through hidden Markov model (HMM) training.

11. The behavior recognition method by combining an image and a speech according to claim 9, wherein the image-and-speech status parameter is the image-and-speech sub-status parameter with a maximum value among the image-and-speech sub-status parameters.

12. The behavior recognition method by combining an image and a speech according to claim 9, wherein each image feature sequence comprises a plurality of image frame status groups, each speech feature sequence comprises a plurality of speech frame status groups, and each feature extraction parameter records a probability parameter for mapping each image frame status group to each speech frame status group.

13. The behavior recognition method by combining an image and a speech according to claim 12, wherein a mapping relation exists between each image frame status group and each speech frame status group, and the step of obtaining a plurality of image-and-speech sub-status parameters further comprises:

obtaining a plurality of image-and-speech recognition probabilities, wherein in one relation calculation of substituting the image feature sequence and the speech feature sequence into the image-and-speech relation parameter, the image frame status groups and the speech frame status groups are substituted into the image-andspeech relation parameter corresponding to the same image-and-speech relation module to calculate the image-and-speech recognition probabilities according to types of the frame mapping relation; and selecting one image-and-speech recognition probability from the image-and-speech recognition probabilities to serve as the image-and-speech sub-status parameter corresponding to the relation calculation, wherein the image-and-speech sub-status parameter is the image-and-speech recognition probability with a maximum value among the image-and-speech recognition probabilities.

14. The behavior recognition method by combining an image and a speech according to claim 9, wherein the step of obtaining a plurality of image feature sequences and a plurality of speech feature sequences comprises:

parsing a plurality of image frame data contained in the gesture image to obtain an image feature value contained in each image frame data;

determining whether the gesture image comprises a plurality of repetitive image data by using the image feature values;

if yes, extracting any one of the repetitive image data to generate each image feature sequence; and if no, converting the gesture image into each image feature sequence.

15. The behavior recognition method by combining an image and a speech according to claim 9, wherein the step of obtaining a plurality of image feature sequences and a plurality of speech feature sequences comprises:

parsing a plurality of speech frame data contained in the speech data to obtain a speech feature value contained in each speech frame data;

determining whether the speech data comprises a plurality of repetitive speech data by using the speech feature values;

if yes, extracting any one of the repetitive speech data to generate each speech feature sequence; and if no, converting the speech data into each speech feature sequence.

16. The behavior recognition method by combining an image and a speech according to claim 9, wherein the target parameter is the recognition probability with a maximum value among the recognition probabilities.

17. The behavior recognition method by combining an image and a speech according to claim 9, wherein a process for establishing any one of the image-and-speech relation modules comprises:

obtaining a training image and a training speech corresponding to each other;

converting the training image and the training speech to generate an image training sequence and a speech training sequence, wherein the image training sequence comprises a plurality of image frame data, and the speech training sequence comprises a plurality of speech frame data;

dividing the image training sequence and the speech training sequence individually by using a plurality of division manners, so as to form a plurality of image division sequences and a plurality of speech division sequences;

deriving mapping relations between the image division sequences and the speech division sequences, so as to generate the image-and-speech relation parameter corresponding to the any one of the image-and-speech relation modules;

recording a feature extraction mode of the training image and the training speech as a feature extraction parameter of the any one of the image-and-speech relation modules; and recording the feature extraction parameter and the image-and-speech relation parameter to form the any one of the image-and-speech relation modules.

* * * * *